(12) United States Patent
Taniguchi

(10) Patent No.: US 11,810,048 B2
(45) Date of Patent: Nov. 7, 2023

(54) UNMANNED DELIVERY SYSTEM BY UNMANNED DELIVERY VEHICLE

(71) Applicant: ZMP INC., Tokyo (JP)

(72) Inventor: Eko Taniguchi, Tokyo (JP)

(73) Assignee: ZMP INC., Tokyo (JP)

( * ) Notice: Subject to any disclaimer, the term of this patent is extended or adjusted under 35 U.S.C. 154(b) by 0 days.

(21) Appl. No.: 17/259,503

(22) PCT Filed: Jul. 8, 2019

(86) PCT No.: PCT/JP2019/026951
§ 371 (c)(1),
(2) Date: Jan. 11, 2021

(87) PCT Pub. No.: WO2020/013114
PCT Pub. Date: Jan. 16, 2020

(65) Prior Publication Data
US 2021/0241224 A1    Aug. 5, 2021

(30) Foreign Application Priority Data

Jul. 12, 2018  (JP) ................................. 2018-132739
Apr. 2, 2019   (JP) ................................. 2019-070931

(51) Int. Cl.
*G06Q 10/0832* (2023.01)
*G06Q 10/0833* (2023.01)
(Continued)

(52) U.S. Cl.
CPC ....... *G06Q 10/0832* (2013.01); *G06Q 10/087* (2013.01); *G06Q 10/0833* (2013.01); *G06Q 50/30* (2013.01)

(58) Field of Classification Search
CPC .. G06Q 10/08; G06Q 10/0833; G06Q 10/087; G06Q 50/30; G06Q 10/0832
(Continued)

(56) References Cited

U.S. PATENT DOCUMENTS 7,711,600 B1 * 5/2010 Curran .................. G06Q 30/00
                                                          705/16
9,828,092 B1 * 11/2017 Navot .............. G06Q 10/08355
(Continued)

FOREIGN PATENT DOCUMENTS

JP    2002207798 A  *  7/2002
JP    2006-341963 A    12/2006
(Continued)

OTHER PUBLICATIONS

"Ford and Domino's Running Autonomous Pizza Delivery Vehicle Trial," by Rain Noe, Aug. 30, 2017 (Year: 2017).*
(Continued)

*Primary Examiner* — Omar Zeroual
*Assistant Examiner* — Brian Adams Heflin
(74) *Attorney, Agent, or Firm* — MILLEN, WHITE, ZELANO & BRANIGAN, P.C.; William Nixon

(57) ABSTRACT

An unmanned delivery system includes a merchandise collection point, vehicle waiting areas, a management center that manages the inventory status of individual pieces of goods in the merchandise collection points and the status of unmanned delivery vehicles at the vehicle waiting areas. A network connects the collection point, the vehicle waiting area, and the management center. The management center selects, based on product order information, the collection point and the vehicle waiting area in accordance with the inventory status of the ordered item and the location of the delivery address, selects an unmanned delivery vehicle, and transmits product delivery information to the unmanned delivery vehicle and the merchandise collection point. The unmanned delivery vehicle autonomously travels to the selected collection point, automatically delivers the ordered item to the delivery address, and autonomously travels to the
(Continued)

vehicle waiting area after the settlement and the delivery are made.

24 Claims, 27 Drawing Sheets

(51) Int. Cl.
 *G06Q 10/087* (2023.01)
 *G06Q 50/30* (2012.01)
(58) Field of Classification Search
 USPC .......................................................... 705/332
 See application file for complete search history.

(56) References Cited

U.S. PATENT DOCUMENTS

| | | | |
|---|---|---|---|
| 10,503,164 B2 | 12/2019 | Ibe et al. | |
| 10,768,039 B2* | 9/2020 | Baduge | G01G 19/415 |
| 2015/0006005 A1 | 1/2015 | Yu et al. | |
| 2016/0055605 A1* | 2/2016 | Kim | G06Q 50/30 |
| | | | 701/465 |
| 2017/0200115 A1* | 7/2017 | High | G06Q 10/083 |
| 2017/0286892 A1* | 10/2017 | Studnicka | G06Q 20/204 |
| 2017/0308098 A1* | 10/2017 | Yu | G05D 1/024 |
| 2018/0024554 A1* | 1/2018 | Brady | G06Q 10/0837 |
| | | | 701/23 |
| 2018/0096270 A1* | 4/2018 | High | G06Q 10/0633 |
| 2018/0139056 A1 | 5/2018 | Imai et al. | |
| 2018/0164818 A1 | 6/2018 | Wilkinson et al. | |
| 2019/0033868 A1* | 1/2019 | Ferguson | G05D 1/0291 |
| 2019/0034859 A1* | 1/2019 | Kim | G05B 19/0428 |
| 2019/0311343 A1* | 10/2019 | Cantrell | G06Q 20/02 |

FOREIGN PATENT DOCUMENTS

| | | | | |
|---|---|---|---|---|
| JP | 2007219980 A | * | 8/2007 | |
| JP | 2009120317 A | * | 6/2009 | |
| JP | 6270953 B1 | * | 1/2018 | |
| JP | 201805865 | | 4/2018 | |
| JP | 2018-081464 A | | 5/2018 | |
| KR | 20170121855 A | * | 4/2016 | |
| KR | 20160123167 A | | 10/2016 | |
| KR | 20180016926 A | * | 3/2017 | |
| WO | WO-2011038018 A1 | * | 3/2011 | G08G 1/168 |
| WO | 2017191695 A1 | | 11/2017 | |

OTHER PUBLICATIONS

International Search Report for PCT/JP2019/026951 dated Oct. 15, 2019.
English Abstract of JP2018058656, Publication Date: Apr. 12, 2018.
English Abstract of JP2006341963, Publication Date: Dec. 21, 2006.
Office Action in corresponding China patent application No. 201980042728.1 dated Feb. 23, 2022 (pp. 1-7) and English translation thereof (pp. 1-6).
Office Action in corresponding KR Application No. 10-2021-7003154 dated Nov. 14, 2022 (pp. 1-7) and english machine translation thereof (pp. 1-9).

* cited by examiner

UNMANNED DELIVERY SYSTEM BY UNMANNED DELIVERY VEHICLE

TECHNICAL FIELD

The present invention relates to an unmanned delivery system by unmanned delivery vehicles for delivering ordered goods to designated delivery addresses.

BACKGROUND ART

With conventional goods delivery service such as door-to-door delivery service, workers manually load goods on a delivery vehicle at a delivery center, etc. where goods are collected. Such delivery vehicles are driven by workers to individual delivery addresses, and goods are transferred manually to each delivery address. All operations, including loading and unloading of goods to and from delivery vehicles and the delivery, are performed manually by workers, and the delivery vehicles are driven to delivery centers and individual delivery addresses by workers.

In the goods delivery service industry, there is a chronicle problem of shortage of labor. In addition, despite the delivery time designation system, there may be cases where goods cannot be delivered because users are not at the designated place at the time of delivery and by other reasons, keeping the rate of redelivery high and thus worsening the shortage of labor.

At present, retail stores including convenience stores are widespread nationwide, allowing users to purchase goods easily at a near-by convenience store and supermarket, or by using food delivery service, etc. However, if desired item not in the store, users must visit other stores to find the desired one or give up purchasing of the item they want. If users give up purchasing, the relevant store might lose the opportunity of selling goods.

Meanwhile, the mail-order service via a network is widespread. Receiving an order for purchase of goods from a user, a mail-order operator picks up relevant item in a warehouse, etc., loads it on a delivery vehicle, and delivers it to the user. Automating pickup and loading of ordered items has recently been attempted widely by using known picking systems. As a creative attempt to save labor in delivery of goods in mail-order service, Patent Literature 1 by the present applicant discloses an unmanned delivery system by unmanned delivery vehicles.

CITATION LIST

Patent Literature

Patent Literature 1: JP 2018-132739
Patent Literature 2: JP 2018-197832 A

SUMMARY OF INVENTION

Technical Problem

By the way, stores including convenience stores have begun to provide their own service of delivering purchased items, and demands for such service are increasing mainly on heavy and bulky goods. In this case also, deliverable goods are limited to those on store counters, and so users' wish to purchase may not be satisfied as the case may be. Furthermore, if two or more stores are scattered in a certain area where each store provides its own delivery service, the delivery area of each store might be overlapped, which makes the delivery service of the entire area inefficient as a whole. Meanwhile, with the mail-order service via a network, since a purchase order might be placed to a store in a remote area, the delivery distance of goods may increase wastefully, raising the delivery cost. Furthermore, if orders are made at the same time by many users, delivery time might increase greatly, and the stores might run out of the relevant goods. In that case, the relevant goods may not be delivered until they are in stock again. Unexpectedly long time may thus be needed for users to get their desired goods. With food delivery service such as the delivery of piazza and sushi, the delivery time is the most important factor. To keep the delivery time short and solve the problem of shortage of labor, unmanned convenience stores and supermarkets are beginning to be put into practical use. However, even with these unmanned stores, users must go to a store, where they must purchase goods that are in stock.

In view of the above, the purpose of the present invention is to provide a delivery system by unmanned delivery vehicles to deliver ordered items to designated delivery addresses quickly, efficiently, and securely.

Solution to Problem

An unmanned delivery system by unmanned delivery vehicles according to a first embodiment of the present invention comprises: a plurality of unmanned delivery vehicles; at least one vehicle waiting area to which at least one of the plurality of unmanned delivery vehicles belongs or where at least one of the plurality of unmanned delivery vehicles stands by; at least one merchandise collection point; a management center that manages the inventory status of individual pieces of goods at the merchandise collection points as well as the state of individual unmanned delivery vehicles that belong to the vehicle waiting areas; and a network that connects the plurality of unmanned delivery vehicles, the merchandise collection points, and the management center to one another, wherein the management center is configured to select, based on a product order information from a user including an ordered item ordered from the user and a delivery address, a merchandise collection point for delivering the ordered item in accordance with the inventory status of the ordered item and the location of the delivery address, select an unmanned delivery vehicle that is standing by at the vehicle waiting area or is traveling and transmit product delivery information including the merchandise collection point where the ordered item is to be picked up, the unmanned delivery vehicle, and the delivery address to the unmanned delivery vehicle and the selected merchandise collection point via the network, the unmanned delivery vehicle comprises: a running unit, a control unit that controls autonomous driving of the running unit, a housing that can house the ordered item, and a settlement unit for settling the payment for the ordered item, wherein the unmanned delivery vehicle is configured to travel autonomously to the merchandise collection point included in the product delivery information, load the ordered item at the merchandise collection point, then autonomously travel to the delivery address, and wherein the unmanned delivery vehicle is configured to notify the user of the arrival, or estimated time of arrival at the time of arrival or before arrival at the delivery address, wait for the settlement of payment by the user and delivery, and autonomously travel to a location instructed by the management center after the settlement of payment by and delivery to the user are completed.

According to the above embodiment, since the management center is configured to select a merchandise collection point and a vehicle waiting area in response to the product order information from the user and based on the inventory status of the ordered item and the location of the delivery address as well as the unmanned delivery vehicle that is capable of delivering the goods to the delivery address as quickly as possible, the item ordered by the user can be delivered to the delivery address quickly. By using unmanned vehicles for delivery, manpower is unnecessary, and thus ordered items can be delivered to delivery addresses quickly and efficiently even in the case of labor shortage.

A second embodiment of the present invention is an unmanned delivery system by unmanned automatic delivery vehicles, comprising: an automatic product collection point for automatically picking a piece of goods ordered by a user, the ordered item being loaded from the automatic product collection point to the unmanned automatic delivery vehicle and delivered to the user automatically, wherein the unmanned delivery vehicle for loading the ordered item picked from a merchandise rack of the automatic product collection point via a transfer means is arranged adjacent to the transfer means, the ordered item is provided with a unique identification information, an identification means for identifying the identification information of the ordered item is provided adjacent to a conveyance route of the ordered item, and the identification means is configured to identify the identification information of the ordered item to judge whether the ordered item is the one that should be loaded onto the unmanned delivery vehicle or not.

More specifically, this second embodiment comprising: a plurality of unmanned delivery vehicles; at least one automatic product collection point; a management center that manages the inventory status of individual pieces of goods at each automatic product collection point and the state of the unmanned delivery vehicles; and a network that connects the plurality of unmanned delivery vehicles, each automatic product collection point, and the management center to one another, wherein the management center is configured to select, based on product order information from the user including the ordered item by the user and delivery address, an automatic product collection point for delivering the ordered item in accordance with the inventory status of the ordered item and the location of the delivery address, select an unmanned delivery vehicle that is standing by at the vehicle waiting area or is traveling, and transmit a product delivery information, including an automatic product collection point where the ordered item is to be picked up, the unmanned delivery vehicle, and the delivery address, to the unmanned delivery vehicle and the automatic product collection point via the network, wherein the unmanned delivery vehicle comprises: a running unit; a control unit that controls autonomous driving of the running unit; and a housing for housing the ordered item, wherein the unmanned delivery vehicle is configured to autonomously travel to the automatic product collection point included in the product delivery information, autonomously travel to the delivery address when the identification means judges that the item is the one to be loaded onto the unmanned delivery vehicle based on the identification information of the ordered item before the ordered item is placed in the housing at the automatic product collection point by a conveyance means, inform the user of the arrival to allow the user to make payment for the ordered item, hand the ordered item over to the user, and then autonomously travel to a location instructed by the management center.

According to the second embodiment, since the ordered item that has been automatically picked up from the automatic product collection point and conveyed by the conveyance means can be confirmed to be the correct item to be loaded onto the unmanned delivery vehicle, the improper loading of goods onto the unmanned delivery vehicle can be prevented without fail, thus allowing the ordered items to be delivered to the delivery addresses more quickly and accurately.

Advantageous Effects of Invention

According to the present invention, a delivery system by an excellent unmanned delivery vehicle can be provided to deliver ordered items to designated delivery addresses quickly and efficiently without loading wrong items.

DESCRIPTION OF EMBODIMENTS

Figure 1:
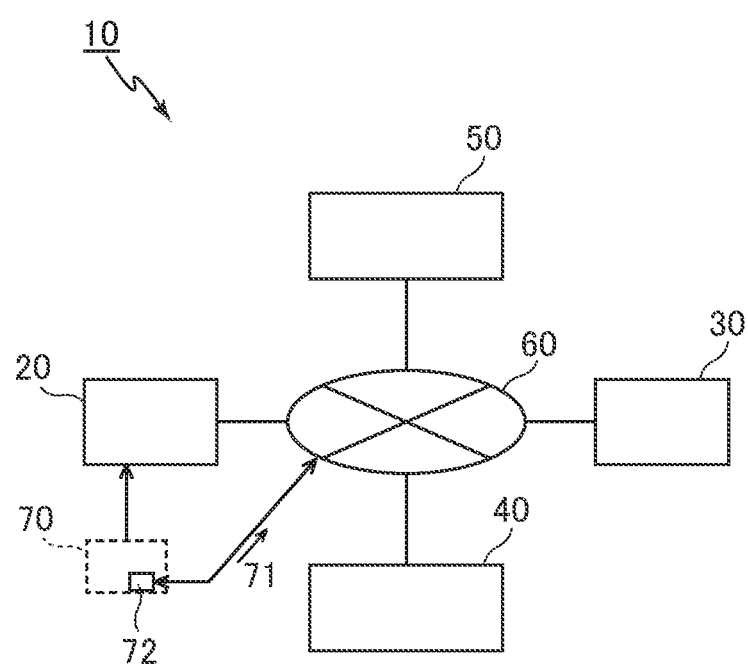
FIG. 1 is a schematic view showing the entire configuration of an embodiment of an unmanned delivery system by unmanned delivery vehicles of the present invention.

The present invention will hereinafter be described in detail based on the embodiments as shown in the drawings.

First Embodiment

FIG. 1 shows the entire configuration of a first embodiment of the unmanned delivery system by the unmanned delivery vehicle according to the present invention. The unmanned delivery system by the unmanned delivery vehicle (hereinafter referred to as unmanned delivery system) 10 includes: a store 20 and/or a warehouse 30 as a merchandise collection point; a vehicle waiting area 40, a management center 50, and a network 60.

Figure 2:
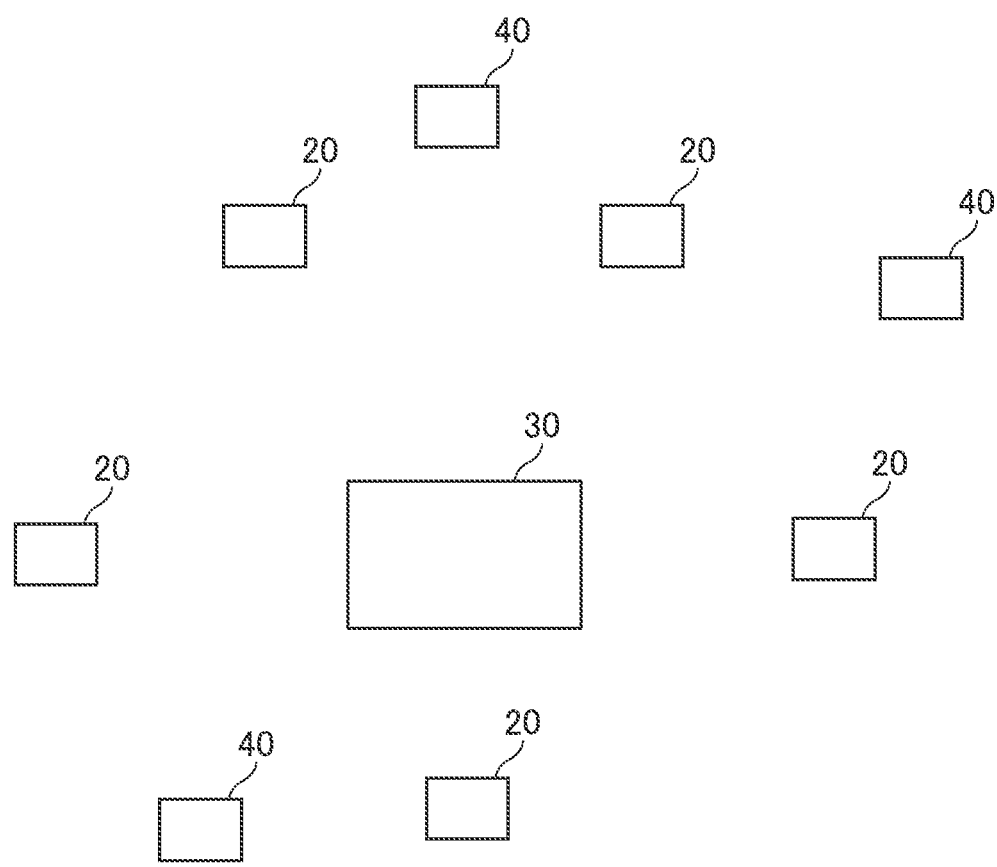
FIG. 2 is a schematic view showing the arrangement of stores as merchandise collection points and a warehouse as shown in FIG. 1.

Only one store 20, one warehouse 30, and one vehicle waiting area 40 are shown in FIG. 1. However, as shown in FIG. 2, a plurality of stores 20 and a plurality of vehicle waiting areas 40 may be arranged. The stores 20 are arranged relatively apart from each other to disperse customers. Whereas only one warehouse 30 is shown in FIG. 1, one or a plurality of warehouses is/are arranged dispersedly in response to the plurality of stores 20. By selecting a proper store 20 and a vehicle waiting area 40 from the plurality of them, ordered items can be delivered to delivery addresses more quickly. The network 60 is a dedicated or general public line, and as described later, by connecting each store 20, warehouse 30, each vehicle waiting area 40, management center 50, and furthermore the user terminal equipment 72 of the user 70 to one another, various information can be transmitted to and received by one another.

Figure 3:
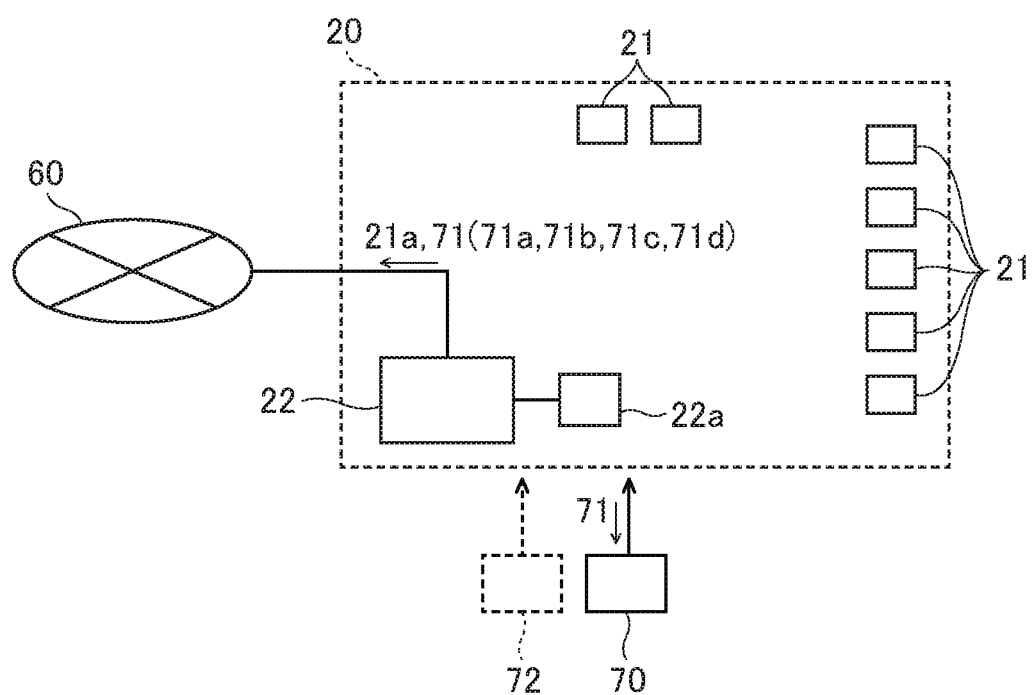
FIG. 3 is a block diagram showing the configuration of the store in the unmanned delivery system as shown in FIG. 1.

The store 20 is a convenience store, for example. As shown in FIG. 3, various goods 21 are displayed and the store terminal equipment 22 is provided to perform an inventory management of the goods 21, a sale processing, etc. The store terminal equipment 22 includes a so-called cash register 22a for performing sale processing, performs various store-related processing such as inventory management of goods 21 and order placement processing at the store, and is connected to the management center 50 via the network 60. The user 70 who has come to the store 20 selects a desired item 21 from the displayed goods 21, and makes a payment at the cash register 22a to purchase the item 21. Also, the store terminal equipment 22 transmits the inventory status of the item 21 at the store 20 to the management center 50 as product inventory information 21a via the network 60.

The user 70 who has come to the store 20 can also make a request to deliver a displayed item 21 or the one that is not in stock to a delivery address such as the user's own house etc. In this case, the user 70 informs a store staff member of user information, ordered item, and delivery address at the store. At the store 20, the store staff operates the store terminal equipment 22 to create a product order information 71, including an order code 71a, a user information 71b, an ordered item 71c, and a delivery address 71d, and transmits the same to the management center 50 via the network 60, and at the same time issues a user authentication key 73 related to the order to the user 70. The user 70 can also operate his/her own terminal equipment 72 without visiting the store 20 to directly place an order for goods to the management center 50 and transmit the product order information 71 via the network 60.

Figure 4:
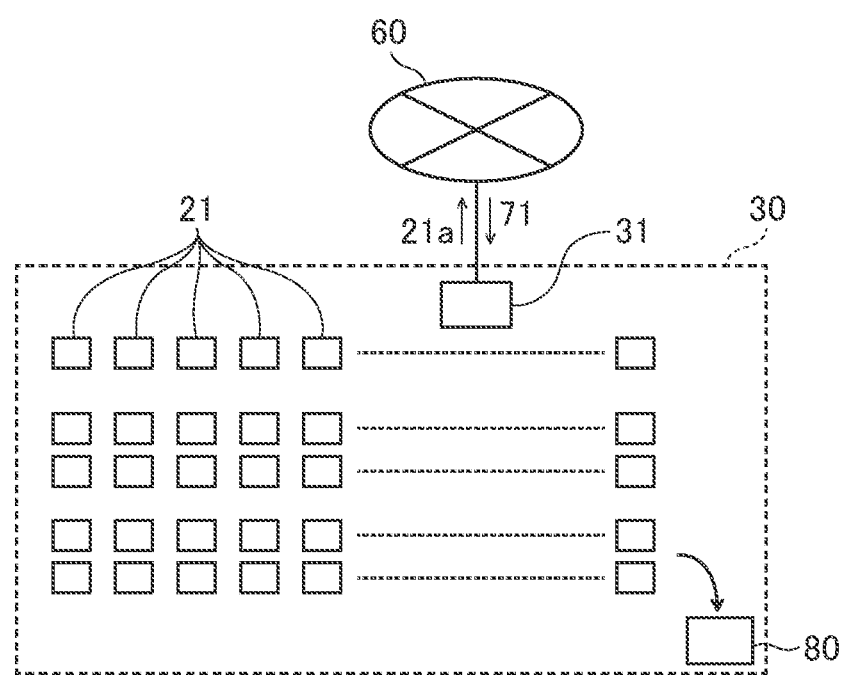
FIG. 4 is a block diagram showing the configuration of the warehouse in the unmanned delivery system as shown in FIG. 1.

As shown in FIG. 4, the warehouse 30 stores many goods 21 that are handled at the store 20, and ordered goods 21 are delivered to a corresponding store 20 as required by a delivery vehicle etc. from the warehouse 30. The warehouse 30 is equipped with a warehouse terminal equipment 31 to perform inventory management of the goods 21 stored in the warehouse 30. The warehouse terminal equipment 31 amends the inventory status in accordance with the arrival or delivery of the goods 21 as required, creates product inventory information 21a showing accurate inventory status at all times, and transmits the same to the management center 50 via the network 60. Even if desired goods 21 are not in stock at the store 20, the ordered item 21 can be directly delivered from the warehouse 30 to the delivery address, thus ensuring quicker delivery of the ordered item 21.

Receiving a product delivery information 54 (described later) from the management center 50 via the network 60, the warehouse terminal equipment 31 allows a worker to select and pick the ordered item 71c from the goods 21 within the warehouse 30 based on the order code 71a and the ordered item 71c included in the product delivery information 54, and gives the worker an instruction to load the item to an unmanned delivery vehicle 80 related to the order code 71a. The ordered item 71c can also be automatically loaded to the unmanned delivery vehicle 80 by using an unmanned picking system. When using the unmanned picking system, not only the transfer from the vehicle waiting area 40 to the warehouse 30 and from the store 20 or warehouse 30, namely the merchandise collection point, to the delivery address but also picking of ordered items at the merchandise collection point and loading onto the unmanned delivery vehicle are performed without manpower, thus ensuring further energy saving. The warehouse terminal equipment 31 amends the inventory information 32 within the warehouse 30 concerning the loaded goods 21, and transmits the information to the management center 50 via the network 60.

Figure 5:
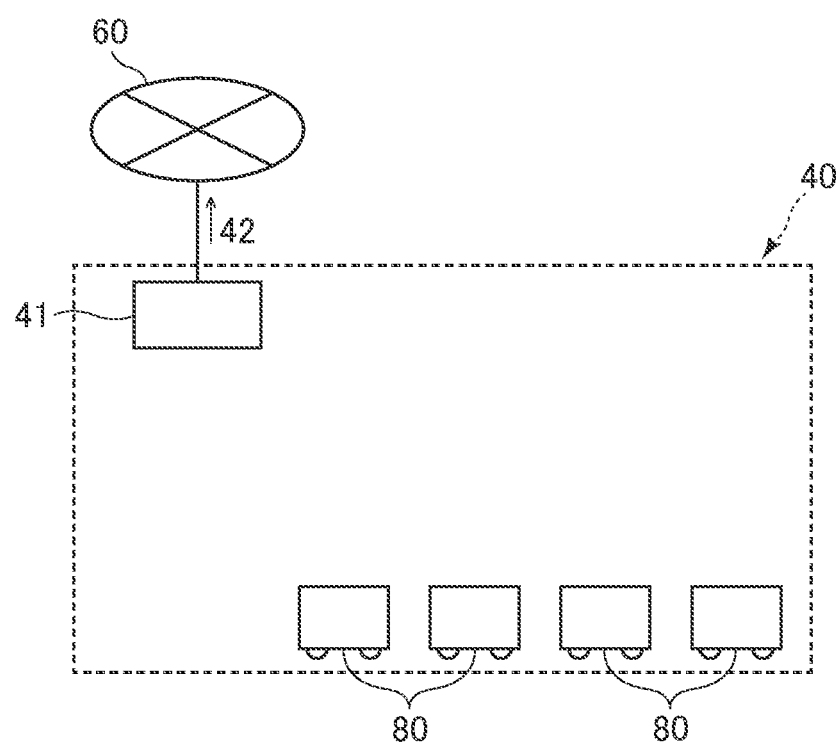
FIG. 5 is a block diagram showing the configuration of the vehicle waiting area as shown in FIG. 1.

The vehicle waiting area 40 is provided alongside the store 20 or the warehouse 30, or independently from them. As shown in FIG. 5, the vehicle waiting area 40 is provided with the control unit 41 in the vehicle waiting area, which is connected to the management center 50 via the network 60, and includes at least one unmanned delivery vehicles 80, or more preferably a plurality of unmanned delivery vehicles 80. At the vehicle waiting area 40, the maintenance works such as charging of the secondary battery, or repairing, etc. of the unmanned delivery vehicles 80 are performed as required based on the instructions from the management center 50.

Figure 6:
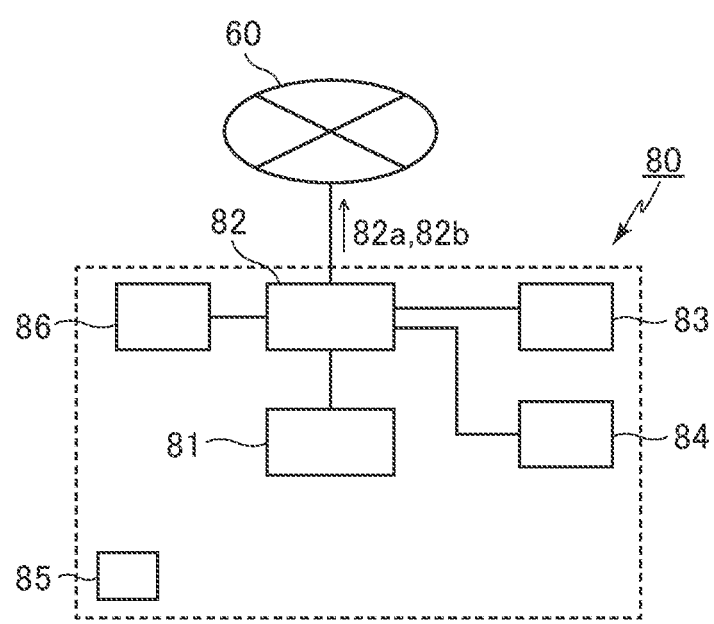
FIG. 6 is a block diagram showing the configuration of the unmanned delivery vehicle as shown in FIG. 1.

The unmanned delivery vehicle 80 has the same structure as a known unmanned automatic drive vehicle, such as the one disclosed in JP 2018-058656 by the present applicant. As shown in FIG. 6, the unmanned delivery vehicle 80 includes: a running unit 81; and a control unit 82 that controls the autonomous driving of the running unit 81. The unmanned delivery vehicle 80 further includes: a housing 83 for housing an ordered item 71c to be delivered; and a settlement unit 84 for making a payment for the ordered item 71c. To individual unmanned delivery vehicles, a vehicle identification information 85 is provided to identify a relevant unmanned delivery vehicle 80. The control unit 82 of the unmanned delivery vehicle 80 receives the product delivery information 54 that is transmitted from the management center 50 via the network 60, records the information to a memory unit 86, transmits a notice of commencement of delivery 82a and the vehicle identification information 85 to the management center 50 via the network 60 based on the product delivery information 54. The control unit 82 of the unmanned delivery vehicle 80 is configured to control the running unit 81 to travel to the merchandise collection point selected based on the product delivery information 54, namely the store 20 or the warehouse 30, pick the ordered item 71c, and then autonomously travel to the delivery address 71d.

The control unit 82 of the unmanned delivery vehicle 80 transmits a notice of arrival 82b when the item has arrived at the delivery address 71d, or expected time of arrival, together with the vehicle identification information 85 to the terminal equipment 72 of the user 70 via the network 60. The arrival or the scheduled time of arrival can thus be notified to the user 70, etc. without fail. After the user 70 enters the user authentication key 73 that is received when the order was placed to the control unit 82 of the unmanned delivery vehicle 80 that has arrived at the delivery address 71d, the control unit 82 checks the user information 71b contained in the product delivery information 54 against the user authentication key 73, and only when they match, allows the settlement unit 84 to make a payment for the delivered item 71c and opens the housing 83. The control unit 82 of the unmanned delivery vehicle 80 then detects that the housing 83 is open and vacant, closes the housing 83, judging that delivery of the ordered item 71c has been completed, transmits a delivery completion notice 82c and the vehicle identification information 85 to the vehicle waiting area 40 to which the vehicle belongs and the management center 50 via the network 60, and controls the running unit 81 to return toward the vehicle waiting area 40 to which the vehicle belongs.

Figure 7A:
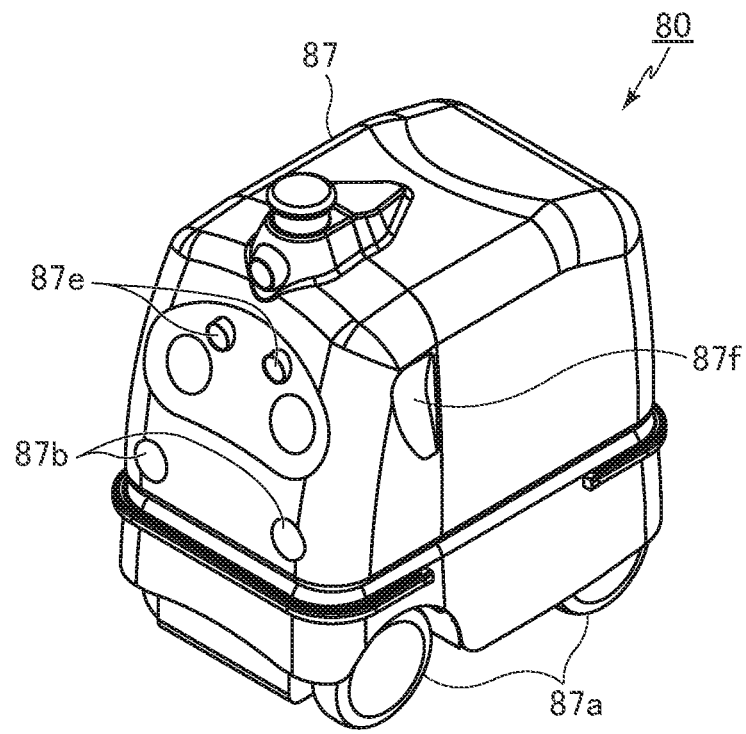
FIG. 7 (A) and FIG. 7 (B) show a specific configuration of the unmanned delivery vehicle in FIG. 6, where FIG. 7 (A) is a front perspective view, and FIG. 7 (B) is a rear perspective view.
Figure 7B:
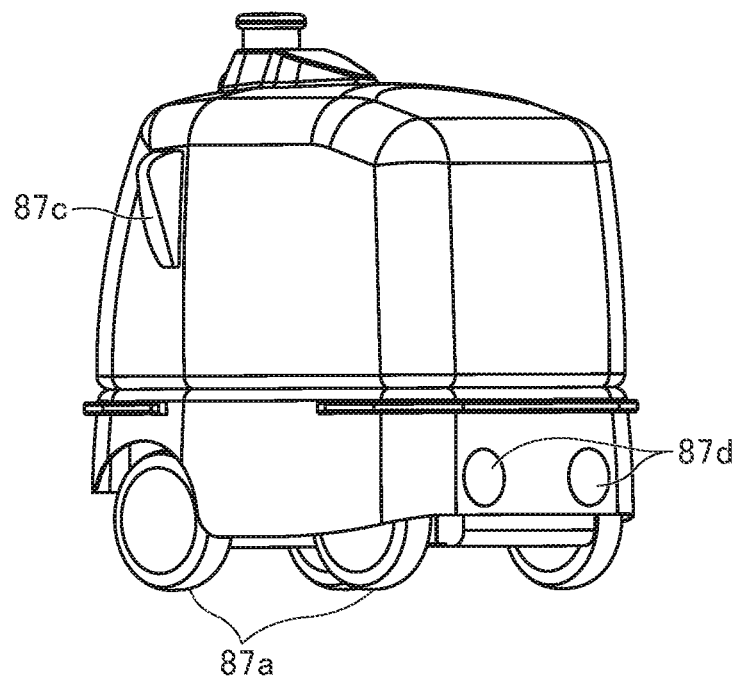

Specifically, as shown in FIG. 7 (A) and FIG. 7 (B), the unmanned delivery vehicle 80 includes: two pairs of wheels 87a at the front and rear of the bottom of the vehicle body 87; front lights 87b; directional indicators 87c; and rear combination lights 87d, all of which are necessary for traveling on roads. The unmanned delivery vehicle 80 further includes: forward-surveillance stereo cameras 87e as well as lateral surveillance cameras 87f etc. all of which are necessary for autonomous driving. Furthermore, the unmanned delivery vehicle 80 includes a housing 83 at the rear of the vehicle. The cargos, etc. can be loaded to or unloaded from the housing 83 by opening or closing the door 83a. The housing 83 may be configured to have a plurality of housing boxes by dividing the same to small rooms. By locking or unlocking each housing box individually, goods can be delivered to each of a plurality of users. The unmanned delivery vehicle 80 autonomously travels on roads based on the detection signals from the forward-surveillance stereo cameras 87e, lateral surveillance cameras 87f, etc. and the map data created in advance.

Receiving the product delivery information 54 (described later) from the management center 50, the control unit 41 in the vehicle waiting area 40 transmits the product delivery information 54 via the network 60 to the designated unmanned delivery vehicle 80 in the vehicle waiting area to which the unmanned delivery vehicles 80 belongs. The unmanned delivery vehicle 80 autonomously travels toward the designated store 20 or warehouse 30 based on the product delivery information 54, picks the designated item 71c at the designated store 20 or the warehouse 30, autonomously travels toward the designated delivery address 71d, and then hands the ordered item 71c over to the user 70 at the delivery address 71d. The control unit 41 in the vehicle waiting area 40 detects each state of the operation of the unmanned delivery vehicle 80, namely "waiting," "during delivering (during traveling)" and "during returning" based on the notice of commencement of delivery 82a and the delivery completion notice 82c transmitted from each unmanned delivery vehicle 80 together with the vehicle identification information 85, creates vehicle a status information 42, and transmits the same to the management center 50 via the network 60.

Figure 8:
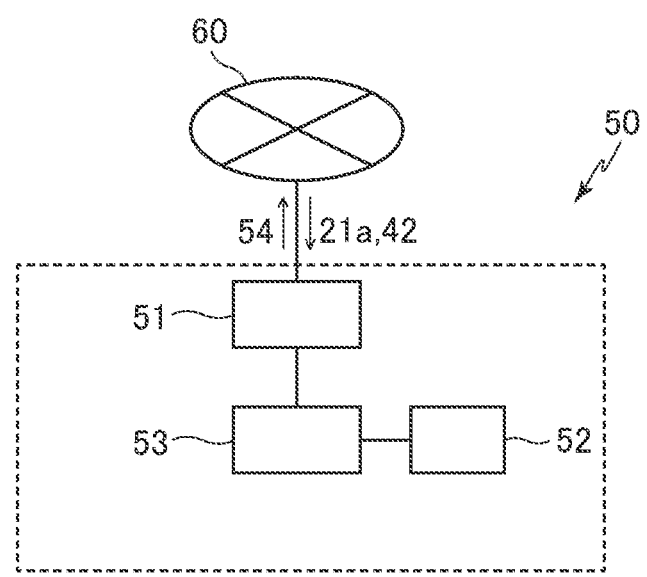
FIG. 8 is a block diagram showing the configuration of the management center as shown in FIG. 1.

The management center 50 includes various information processing devices such as a server, a workstation, and a cloud server provided at appropriate places. As shown in FIG. 8, the management center 50 is provided with a transceiver 51, a memory unit 52, and a control unit 53. The processing at the management center 50 is executed by a program-controlled computer such as the server, the workstation, and the cloud server etc. As a memory medium, a magnetic disk, semiconductor memories, and other arbitrary media that can be read by the computer are used. The program recorded in the memory medium may be read into the computer by directly inserting the medium to the computer, or via various networks. The memory unit 52 and the control unit 53 are configured as separate servers, and may be connected to each other via a LAN such as a network in the premises.

The transceiver 51 of the management center 50 is connected via the network 60 so that communications can be established with one another among the store terminal equipment 22 of the store 20, the warehouse terminal equipment 31 of the warehouse 30, the control unit 41 in the vehicle waiting area 40, the control unit 82 of each unmanned delivery vehicle 80, and the user terminal equipment 72 of the user 70.

The transceiver 51 of the management center 50 receives the product inventory information 21a from each stores 20 and each warehouses 30 via the network 60, registers the same to the memory unit 52 as database, and transmits the product inventory information 21a to the control unit 53. The control unit 53 of the management center 50 can thus assess the product inventory information 21a regarding the goods 21 at all the stores 20 and warehouses 30 under control, ensuring centralized control.

Furthermore, the transceiver 51 of the management center 50 receives the vehicle status information 42, namely "standby", "during delivering" or "during returning" of each unmanned delivery vehicles 80 from each vehicle waiting areas 40 via the network 60, registers the same to the memory unit 52 as database, and transmits the vehicle status information 42 to the control unit 53. The control unit 53 of the management center 50 can thus assess the states of each unmanned delivery vehicles 80 at all the vehicle waiting areas 40 under control, ensuring centralized control.

Receiving the product order information 71 of the user 70 from the store terminal equipment 22 of the store 20 via the network 60, the transceiver 51 of the management center 50 registers the product order information 71 to the memory unit 52, and outputs the product order information 71 to the control unit 53. The control unit 53 of the management center 50 selects a merchandise collection point, which is a store 20 or a warehouse 30, and which has the ordered item 71c in stock and is close to the delivery address 71d, based on the order code 71a, the user information 71b, the ordered item 71c and the delivery address 71d contained in the product order information 71 based on the product inventory information 21a, and selects the vehicle waiting area 40 that is nearest to the selected store 20 or the selected warehouse 30 based on the vehicle status information 42.

If the ordered item 71c is not in stock in the merchandise collection points comprising the store 20 or the warehouse 30 nearest to the delivery address 71d, the control unit 53 of the management center 50 selects a second merchandise collection points comprising the store 20 or the warehouse 30 that is the second nearest to the delivery address. When no unmanned delivery vehicle 80 in standby is available in the vehicle waiting area 40 nearest to the merchandise collection point, namely the selected store 20 or the selected warehouse 30, the control unit 53 of the management center 50 selects a vehicle waiting area 40 having an unmanned delivery vehicle 80 that can arrive at the selected merchandise collection point comprising the selected store 20 or the warehouse 30, in the shortest delivery time or at the earliest possible time, such as a returning unmanned delivery vehicle that belongs to the vehicle waiting area 40 or the one that is standing by at another vehicle waiting area 40. By appropriately selecting the vehicle waiting area 40, the ordered item 71c can be delivered to the delivery address 71d more quickly. The control unit 53 may execute delivery time optimization so that this delivery time becomes the shortest. Even when there is no unmanned delivery vehicle 40 on standby at the selected vehicle waiting area 40, the ordered item 71c can be delivered to the delivery address 71d more quickly by selecting an unmanned delivery vehicle 80 that can arrive at the selected merchandise collection point 40 earlier.

The control unit 53 of the management center 50 creates the product delivery information 54 including a selected product accumulation point 54a, namely a store 20 or warehouse 30, a vehicle waiting area 54b, the user information 71b, the ordered item 71c, and the delivery address 71d, and transmits the product delivery information 54 to the store 20 or the warehouse 30 of the selected merchandise collection point and to the vehicle waiting area 40 via the network 60.

Figure 9:
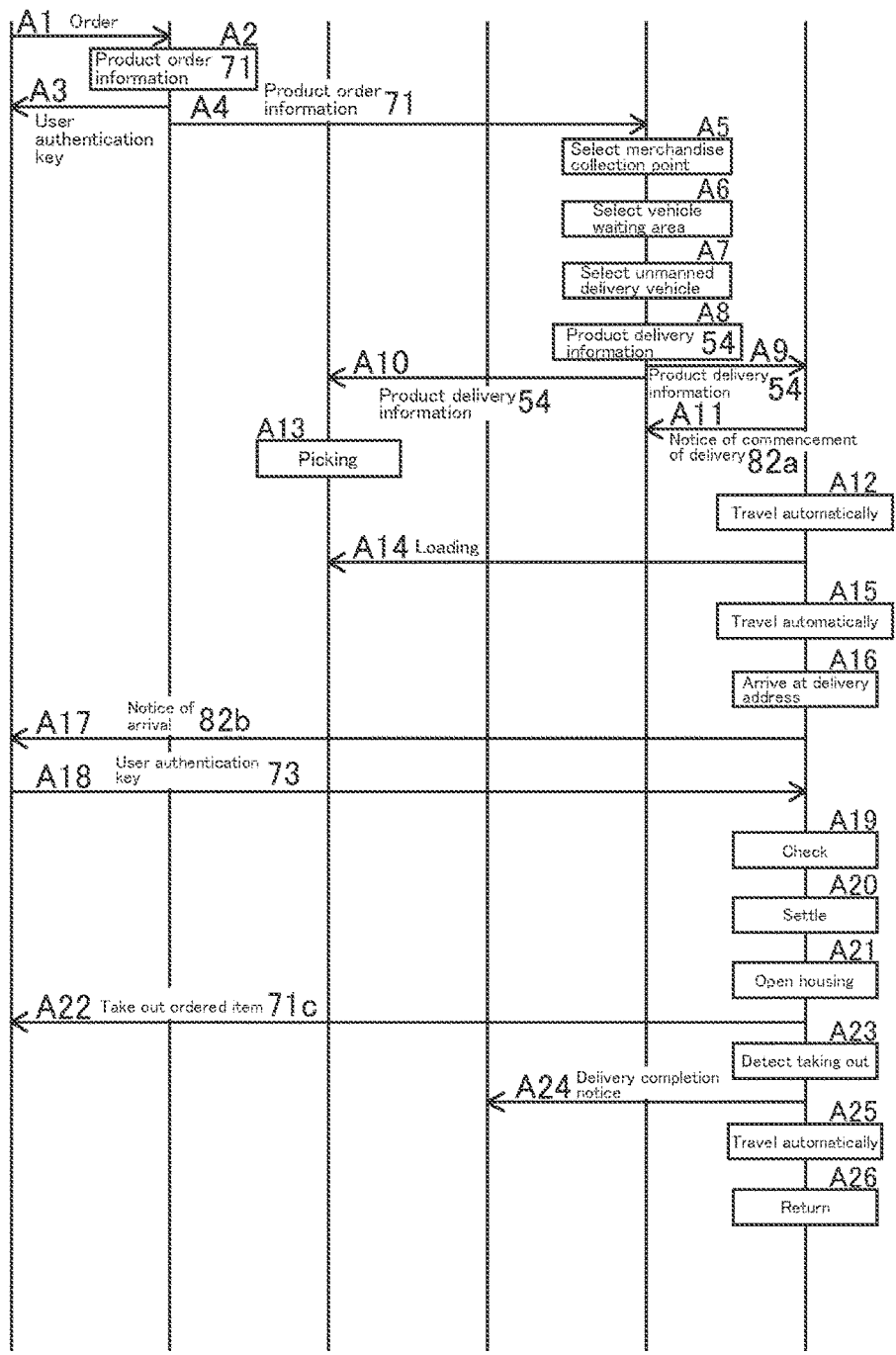
FIG. 9 is a flow chart sequentially showing the operation of unmanned delivery of an ordered item to a user at a store by the unmanned delivery system as shown in FIG. 1.
Figure 10:
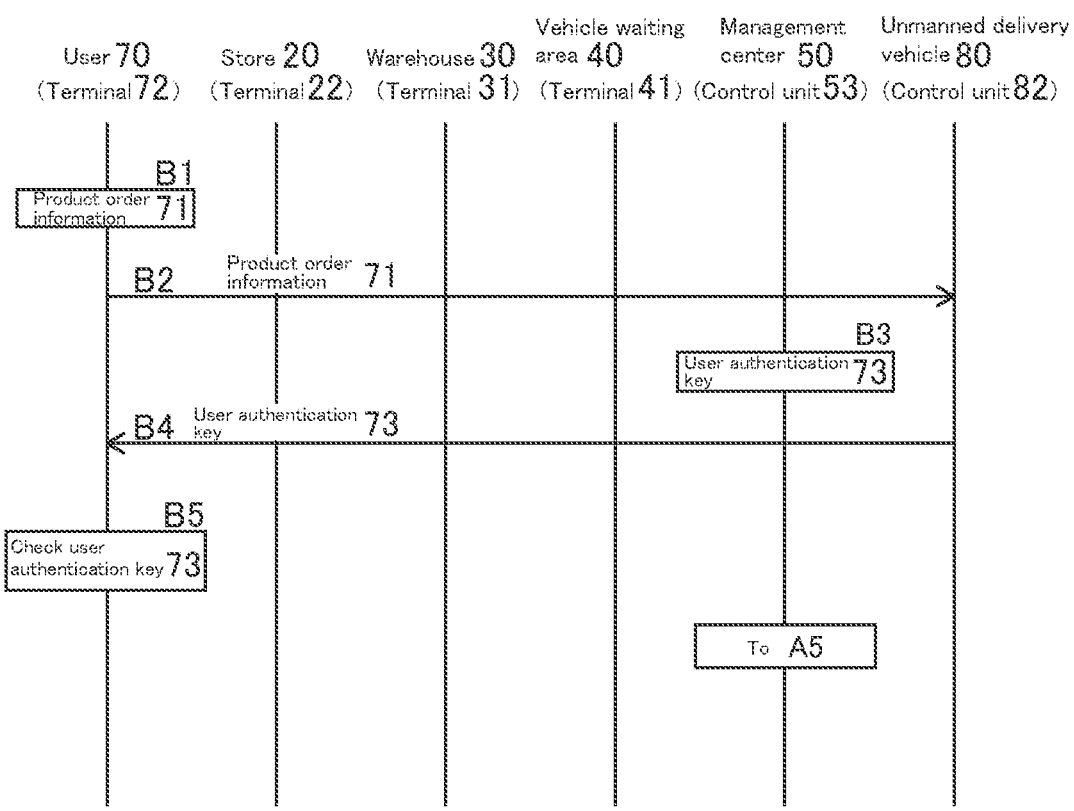
FIG. 10 is a flow chart sequentially showing a part of operation of unmanned delivery by the unmanned delivery system as shown in FIG. 1 in the case where the user orders goods directly to the management center using user terminal equipment.

The unmanned delivery system 10 according to the present invention operates as shown in the flow charts in FIGS. 9 and 10. A case where the user 70 orders goods at the store 20 will be described first according to the flow chart in FIG. 9. In the flow chart in FIG. 9, the user 70 places an order for goods at the store 20 in step A1, the store terminal equipment 22 at the store 20 creates product the order information 71 in step A2, the user authentication key 73 is issued to the user 70 in step A3, and in step A4, the product order information 71 is transmitted to the management center 50 via the network 60.

Receiving the information in step A5, the control unit 53 of the management center 50 refers to the product inventory information 21a, selects a merchandise collection point, where the ordered item 71c contained in the product order information 71 is in stock and which is nearest to the delivery address 71d, i.e. warehouse 30 in the case shown, and in step A6, selects the vehicle waiting area 40 nearest to the selected warehouse 30 by referring to the vehicle status information 42.

In step A7, the control unit 53 of the management center 50 selects the unmanned delivery vehicle 80 on standby at the selected vehicle waiting area 40 based on the vehicle identification information 85, and in step A8, creates product delivery information 54 including the selected store 54a, the vehicle waiting area 54b, the user information 71b, the ordered item 71c, and the delivery address 71d. In step A9, the control unit 53 of the management center 50 transmits the product delivery information 54 to the selected unmanned delivery vehicle 80 at the selected vehicle waiting area 40, and in step A10, transmits the product delivery information 54 to the warehouse 30, which is the selected merchandise collection point.

Receiving the product delivery information 54 in step A11, the control unit 82 of the unmanned delivery vehicle 80 transmits the notice of commencement of delivery 82a and vehicle identification information 85 to the management center 50 via the network 60, and in step A12, controls the running unit 81 based on the product delivery information 54 to autonomously travel toward the selected warehouse 30. Meanwhile, in step A13, receiving the product delivery information 54, the warehouse terminal equipment 31 of the warehouse 30 picks the ordered item 71c based on the product delivery information 54, and waits for the arrival of the unmanned delivery vehicle 80 in charge of the delivery of the ordered item 71c. On arrival of the unmanned delivery vehicle 80, the warehouse terminal equipment 31 of the warehouse 30 loads the ordered item 71c onto the housing 83 of the unmanned delivery vehicle 80 in step A14.

The unmanned delivery vehicle 80 to which the ordered item 71c has been loaded travels autonomously toward the delivery address 71d in step A15. On arrival of the unmanned delivery vehicle 80 at the delivery address 71d in step A16, the control unit 82 of the unmanned delivery vehicle 80 transmits the notice of arrival 82b to the user terminal equipment 72 of the user 70 via the network 60 in step A17. Receiving the notice of arrival 82b, the user 70 enters the user authentication key 73 to the control unit 82 of the unmanned delivery vehicle 80 at the delivery address 71d in step A18. The control unit 82 of the unmanned delivery vehicle 80 then checks the user information 71b contained in the product delivery information 54 against the user authentication key 73 in step A19, and when they match, the payment for the ordered item 71c is made at the settlement unit 84 in step A20, and in step A21, the housing 83 is opened to wait for the delivery of the ordered item 71*c* to the user 70.

After the user 70 takes out the ordered item 71*c* from the housing 83 in step A22, the control unit 82 of the unmanned delivery vehicle 80 detects the opening and vacancy of the housing 83 in step A23, and closes the housing 83, judging that delivery of the ordered item 71*c* has been completed. In step A24, the control unit 82 of the unmanned delivery vehicle 80 transmits the delivery completion notice 82*c* and the vehicle identification information 85 to the vehicle waiting area 40 to which the vehicle belongs and the management center 50 via the network 60. In step A25, the running unit 81 is controlled to autonomously travel toward the vehicle waiting area 40 to which the vehicle belongs, and in step A26, the unmanned delivery vehicle returns to the vehicle waiting area 40 to which the vehicle belongs. Thus, the delivery of the ordered item 71*c* of the user 70 to the delivery address 71*d* and return of the vehicle have been completed.

How a user 70 directly orders goods to the management center 50 by using his/her own user terminal equipment 72 will then be described according to the flow chart in FIG. 10. In step B1 of the flow chart, the user 70 creates product order information 71 by using his/her own user terminal equipment 72, and in step B2, transmits the product order information 71 to the management center 50 via the network 60.

Receiving the information, the control unit 53 of the management center 50 issues the user authentication key 73 for the product order information 71 in step B3, and in step B4, transmits the user authentication key 73 to the user terminal equipment 72 of the user 70 via the network 60. At that time, the user 70 can check the user authentication key 73 by viewing the user authentication key 73 displayed on the screen of his/her own user terminal equipment 72 in step B5. The scheduled arrival time may be included as the information displayed on the user terminal equipment 72 by the control unit 53 of the management center 50 via the network 70.

Then, the control unit 53 of the management center 50 performs operations as shown in step A5 and subsequent steps shown in the flow chart in FIG. 9, picking and loading the ordered item 71*c* of the user 70 at the warehouse 30, and delivers the goods to the delivery address 71*d* by autonomous driving. The user 70 enters the user authentication key 73 to the control unit 82 of the unmanned delivery vehicle 80 that has arrived at the delivery address 71*d*, the payment for the ordered item 71*c* and the delivery of the ordered item 71*c* from the housing 83 are then performed, and the unmanned delivery vehicle returns to the vehicle waiting area 40 to which it belongs by autonomous driving. The user 70 can thus place the order for goods 21 directly to the management center 50 via the network 60 at an arbitrary place and receive the ordered item 71*c* at the delivery address 71*d* without visiting the store 20.

The present invention can be executed in various embodiments within a range that does not depart from the scope of the present invention. It is obvious that the unmanned delivery vehicle 80 may not belong to a specific vehicle waiting area 40 and may travel to the nearest vehicle waiting area 40 or a vehicle waiting area 40 that has a few unmanned delivery vehicles 80 on standby after delivery is completed. By allowing a plurality of vehicle waiting areas 40 to share unmanned delivery vehicles 80, the unmanned delivery vehicles 80 can be accommodated from another vehicle waiting area 40 when the sufficient number of unmanned delivery vehicles 80 on standby are not available, thus decreasing the number of the unmanned delivery vehicles 80.

By dividing the housing 83 of the unmanned delivery vehicle 80 into two or more compartments, or allowing the unmanned delivery vehicle 80 to have a plurality of independent housings 83, a plurality of delivery addresses 71*d* can be visited only by one delivery operation, thus allowing a plurality of orders to be processed at once to further increase the delivery efficiency.

Specifically, when the unmanned delivery vehicle 80 is equipped with a plurality of hosing boxes and the goods in some of which have already been delivered with leaving empty housing boxes, the new goods 21 may be loaded onto the empty housing boxes of the unmanned delivery vehicle 80.

If the housing boxes of the unmanned delivery vehicle 80 become empty, the information about empty is notified to the management center 50. The management center 50 retrieves order information 71 of goods that have yet to be delivered, and finds the nearest merchandise collection point 30 that has the goods 21 to be loaded onto the unmanned delivery vehicle 80 having an empty housing 83 and is arranged in the middle of the traveling route of the unmanned delivery vehicle 80. Even if the unmanned delivery vehicle 80 is on the way to the next delivery address 71*d*, the management center 50 may allow the vehicle to drop by that merchandise collection point 30 and load new goods 21, and then allow the loading to be reflected on the subsequent delivery plan, provided that the nearest merchandise collection point 30 exists on the way to the next delivery address 71*d*. When two or more boxes of the unmanned delivery vehicle 80 become empty, the control unit 30 of the management center 50 may optimize the delivery so that the management center 50 can select the unmanned delivery vehicle 80 that is nearest to the merchandise collection point 30 to increase the efficiency of the delivery plan.

According to this embodiment, the goods 21 can be delivered to still another delivery address 71*d* more quickly. In this case, since the vehicle makes a stop at the merchandise collection point 30, the delivery time to the next delivery address 71*d* is slightly prolonged. However, delivery time can be adjusted by putting a flexibility of approximately one hour for example into the delivery time.

Second Embodiment

The present invention will hereinafter be described in detail based on a second embodiment.

Figure 11:
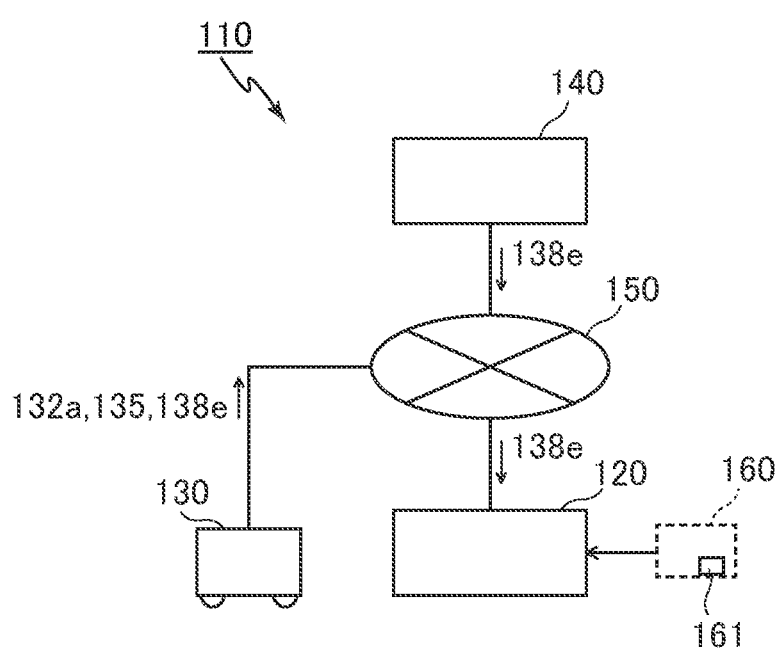
FIG. 11 shows a second embodiment of the present invention, the entire configuration of an unmanned delivery system that performs unmanned picking of an ordered item, loading of the same, and delivery of the same to a user.

FIG. 11 shows the entire configuration of a second embodiment of an unmanned delivery system by unmanned delivery vehicles according to the present invention. In FIG. 11, the unmanned delivery system by the unmanned delivery vehicle (hereinafter referred to as unmanned delivery system) 100 comprises: an unmanned store 120 as an automatic merchandise collection point; an unmanned delivery vehicle 130; a management center 140; and a network 150.

Only one unmanned store 120 and one unmanned delivery vehicle 130 are shown in FIG. 11. Practically, however, a plurality of unmanned stores 120 and a plurality of unmanned delivery vehicles 130 are arranged. Each unmanned store 120 is disposed apart from each other by a certain distance to disperse customers. The network 150 is a dedicated line or general public line, and as described later, can transmit and receive various information by interconnecting each unmanned store 120, each unmanned delivery vehicle 130, the management center 140, and furthermore each user terminal equipment 161 of the user 160.

Figure 12:
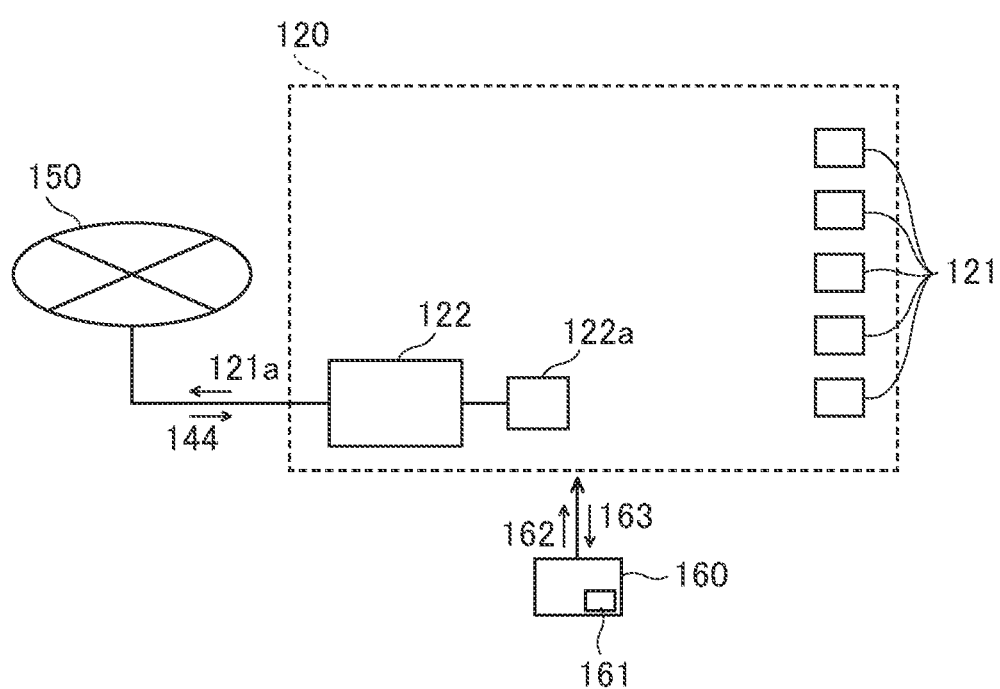
FIG. 12 is a block diagram showing the configuration of the unmanned store as shown in FIG. 11.

The unmanned store 120 is configured as an unmanned convenience store for example, and as shown in FIG. 12, many goods 121 of various kinds are displayed and a store terminal equipment 122 is provided to perform inventory management, sale processing, etc. of the goods. The store terminal equipment 122 has a so-called self-checkout 122a to perform sale processing for example. The store terminal equipment 122 is configured so that various processing regarding sale operations, such as inventory management and order processing of goods 121, can be performed at the store, and is connected to the management center 140 via the network 150. The user 160 who has come to the unmanned store 120 selects a desired item 121 from the displayed goods 121, and makes payment at the self-checkout 122a to purchase the item 121. The store terminal equipment 122 also transmits the inventory status of the item 121 at the unmanned store 120 to the management center 140 via the network 150 as a product inventory information 121a.

When the user 160 visits the unmanned store 120 and finds that the desired item 121 is not displayed or in stock, the user can make a request to deliver the item to a desired delivery address 162d such as the user's own house. In this case, the user 160 operates the store terminal equipment 122 or the user's own user terminal equipment 161 to allow the store terminal equipment 122 or the user's own user terminal equipment 161 to create product an order information 162, including an order code 162a, a user information 162b, an ordered item 162c and a delivery address 162d, in accordance with the ordered item of the user 160, transmit the information to the management center 140 via the network 150, and issue a user authentication key 163 regarding the order to the user terminal equipment 161 of the user 160. Or the user 160 may operate the user's own user terminal equipment 161 to directly transmit the product order information 162 to the management center 140 via the network 150 without visiting the unmanned store 120 to place an order.

Receiving a product delivery information 144 (described later) from the management center 140 via the network 150, the store terminal equipment 122 allows a known unmanned picking system to select and pick the ordered item 162c from the goods 121 of the unmanned store 120 in stock based on the order code 162a and ordered item 162c contained in the product delivery information 144. As the case may be, a packing is performed by an automatic packing device, a shipping slip 126a displaying the identification information of the ordered item 162c is attached, and then loading onto the unmanned delivery vehicle 130 related to the order code 162a is instructed. The store terminal equipment 122 modifies the product inventory information 121a regarding the loaded goods 121, and transmits this information to the management center 140 via the network 150.

Figure 13:
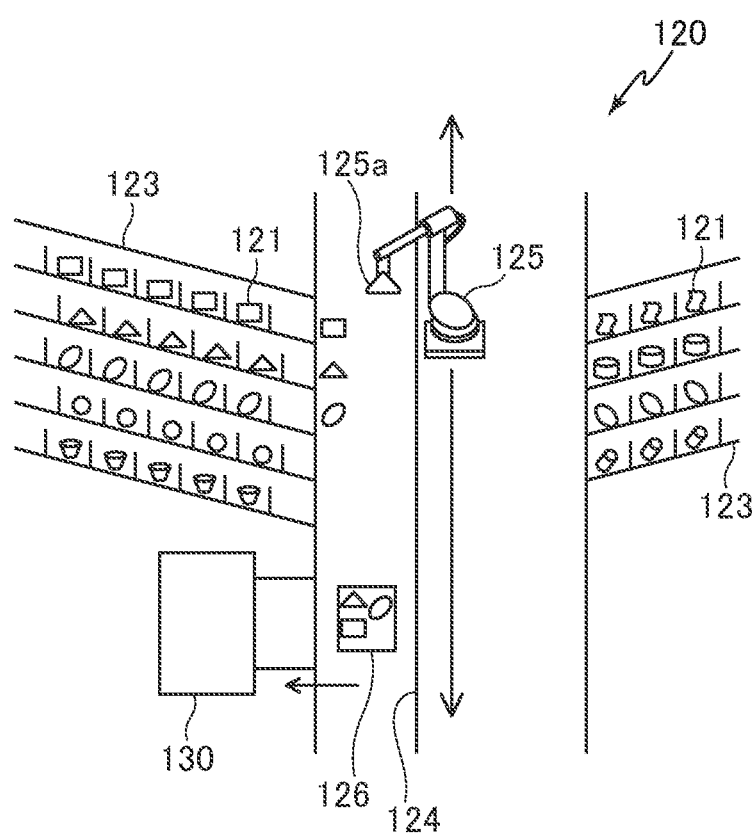
FIG. 13 is an explanatory diagram showing an example of arrangement of goods in the unmanned store as shown in FIG. 12 and picking operation.

At the unmanned store 120, goods 121 are displayed on a plurality of slanting merchandise racks 123 arranged in line on both sides by the type of goods 121 as shown in FIG. 13 for example. A picking robot 125 that is movable on a rail 124 raises an item 121 that is at the front of each merchandise rack 123 using a suction grip hand 125a, and the picking robot 125 travels along the rail 124. By releasing the item 121 within a shipping box 126 placed close to the end of the rail 124, the item 121 is picked. The picking robot 125 picks the item 121 corresponding to the ordered item 162c based on the product order information 162 that has been sent to the store terminal equipment 122, and inserts the same into the shipping box 126. The ordered items 162c can thus be put into the shipping box 126 in batch for each user 160. To each item 121, a barcode or RF tag is attached or printed for identification.

Figure 14:
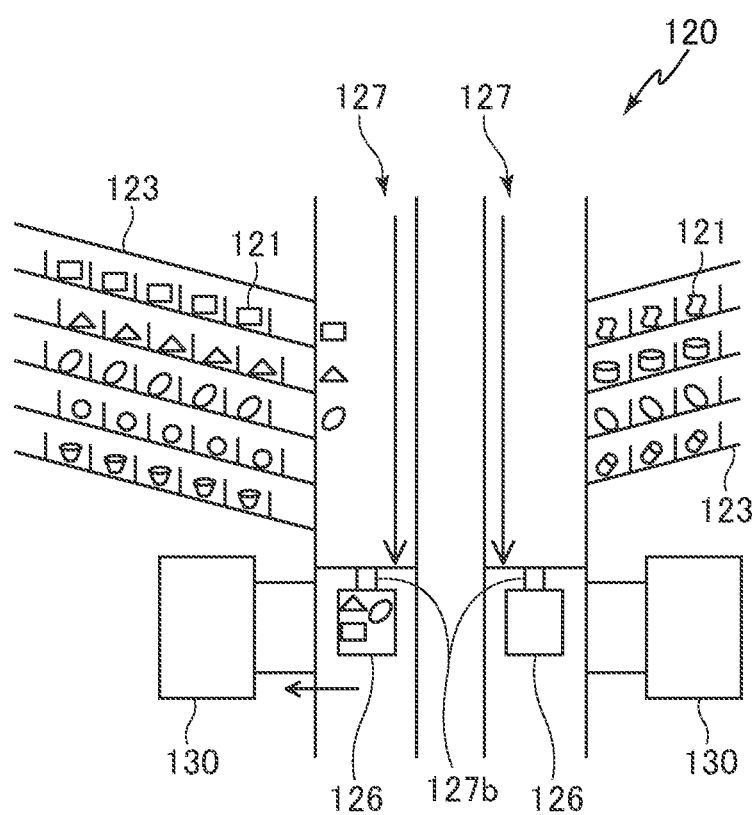
FIG. 14 is an explanatory drawing showing another example of arrangement of goods in the unmanned store as shown in FIG. 12 and picking operation.
Figure 15:
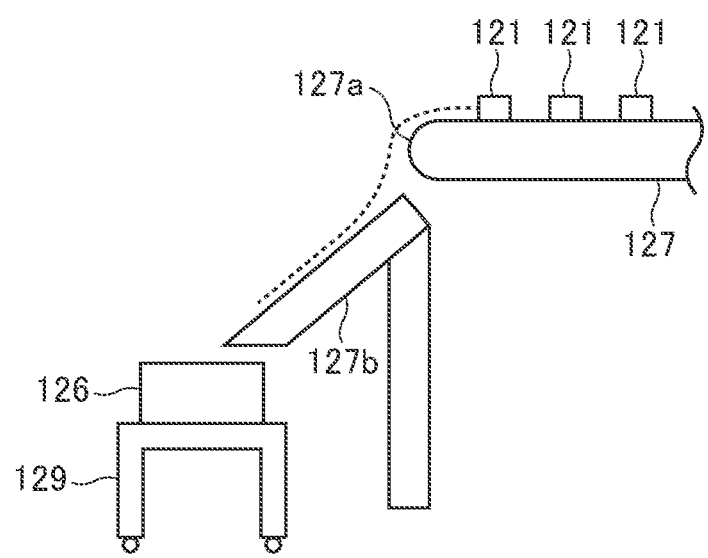
FIG. 15 is a side schematic view showing an example of conveyance route of goods to a shipping box in the picking operation as shown in FIG. 14.
Figure 16:
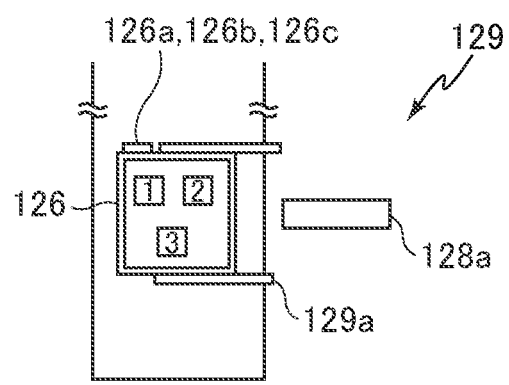
FIG. 16 is a plan schematic view showing the packing operation of the shipping box into which the goods have been loaded in the picking operation as shown in FIG. 13 or FIG. 14.

A picking system of another configuration can also be used instead of the picking robot 125 described above. For example, a transfer means as shown in FIG. 14 and FIG. 16 may be used. In FIG. 14, a conveyer belt 127 is used as a transfer means. The item 121 picked from each merchandise rack 123 is transferred toward the bottom of the figure on the conveyer belt 127, and as shown in FIG. 15, slides down into the shipping box 126 disposed on a transfer table 128 along the ramp 127b arranged adjacent to the end 127a of the conveyer belt 127. The item 121 can thus be picked.

As shown in FIG. 16, the shipping box 126 that contains the item 121 corresponding to the ordered item 162c may be checked using a barcode or RF tag provided on each item 121 in a state held by the pair of holding members 129a of the packing device 129 from both sides to make sure that the item is the ordered one. The barcode or the RF tag is read by using a barcode reader or an RF tag reader provided around the shipping box 126 (not shown), and the reading may be informed to the store terminal equipment 122 via a short-distance wireless LAN such as Wi-Fi (registered trademark) or Bluetooth (registered trademark).

The shipping box 126 held by the holding unit 129a from both sides is packed and the shipping slip 126a is attached to the shipping box 126. The order code 162a, the ordered item 162c, the delivery address 162d, etc., of the product order information 162 are printed on the shipping slip 126a regarding the item 121 packed in the shipping box 126 together with an identification information 126b corresponding to the order code 162a. The identification information 126b should be identifiable by image identification, and may be configured by two- or three-dimensional barcode, etc.

When the item 121 corresponding to the ordered item 162c is relatively large, the item 121 may be delivered by itself without being put into the shipping box 26. In this case, the shipping slip 126a including the identification information 26b described above is directly attached on the surface of the package of the item 121. The subsequent description assumes the item 121 that is delivered by itself to be delivered in the shipping box 126.

Figure 17:
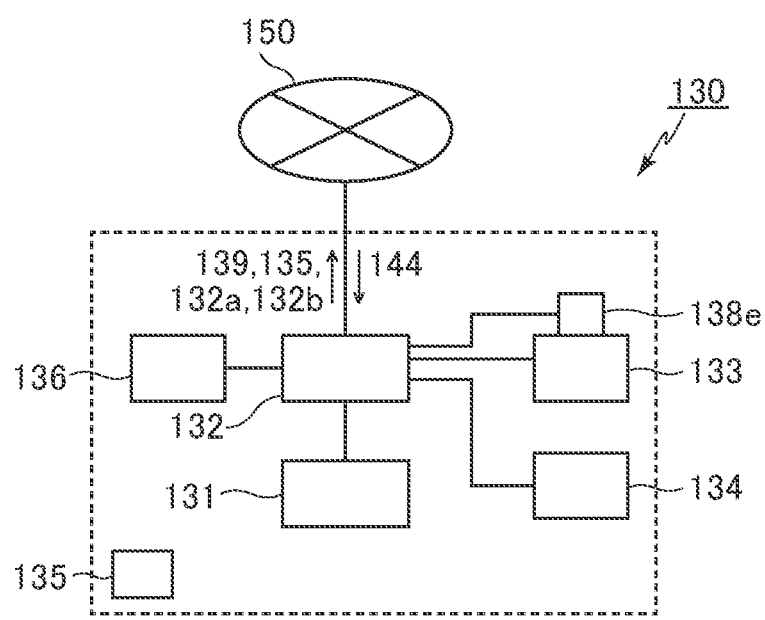
FIG. 17 is a block diagram showing the configuration of the unmanned delivery vehicle as shown in FIG. 11.

The unmanned delivery vehicle 130 has the same structure as the unmanned delivery vehicle 80 as shown in FIG. 6. As shown in FIG. 17, the unmanned delivery vehicle 130 comprises: a running unit 131; a control unit 132 that controls autonomous driving of the running unit 131; a housing 133 for housing the ordered item 162c; and a settlement unit 134 for performing payment for the ordered item 162c. Furthermore, a vehicle identification information 135 is provided to identify the unmanned delivery vehicle 130. The control unit 132 of the unmanned delivery vehicle 130 receives the product delivery information 144 transmitted from the management center 140 via the network 150 and records the information to a memory unit 136, transmits a notice of commencement of delivery 132a and the vehicle identification information 135 to the management center 140 via the network 150 based on this product delivery information 144, controls the running unit 131 to allow the unmanned delivery vehicle 130 to travel to the unmanned store 120 selected based on the product delivery information 144, loads the ordered item 162c by opening the housing 133, closes the housing 133 again, and controls the running unit 131 to autonomously travel to the delivery address 162d.

On arrival at the delivery address 162d, the control unit 132 of the unmanned delivery vehicle 130 transmits a notice of arrival 132b and the vehicle identification information 135 to the terminal equipment 161 of the user 160 via the network 150. When the user 160 enters the user authentication key 163 received at the time of placement of the order to the control unit 132 of the unmanned delivery vehicle 130 that has arrived at the delivery address 162d, the control unit 132 checks the user information 162b contained in the product delivery information 144 against the user authentication key 163. When they match, the payment for the delivered item 162c is made by the settlement unit 134, and the housing 133 is opened. The control unit 132 of the unmanned delivery vehicle 130 then detects opening and vacancy of the housing 133, and closes the housing 133, assuming that the delivery of the ordered item 162c has been completed. The control unit 132 then transmits a delivery completion notice 132c and the vehicle identification information 135 to the management center 140 via the network 150 and controls the running unit 131 to return to a nearby unmanned store 120.

Figure 18A:
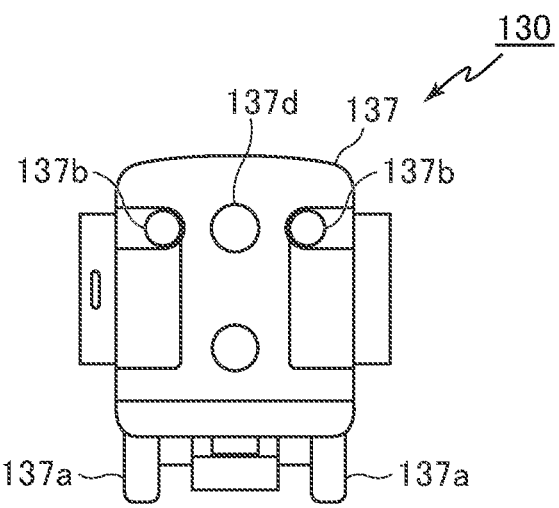
FIG. 18 (A) and FIG. 18 (B) show a specific configuration of the unmanned delivery vehicle in FIG. 14, where FIG. 18 (A) is a front view and FIG. 18 (B) is a side view.
Figure 18B:
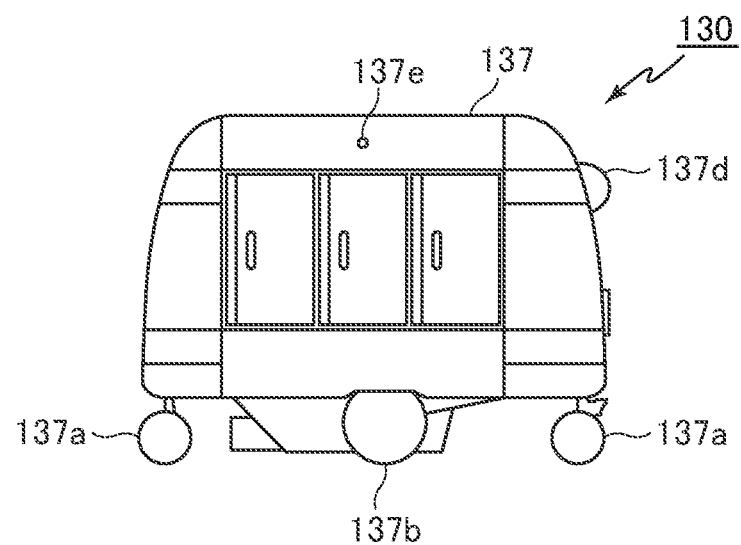

As shown in FIG. 18 (A) and FIG. 18 (B), the unmanned delivery vehicle 130 specifically includes two pairs of casters 137a at the front and the rear bottom of the vehicle body 137 and driving wheels 137b at the center. As same as in the case of the unmanned delivery vehicle 80 shown in FIG. 7 (A) and FIG. 7 (B), the unmanned delivery vehicle 130 includes front lights 137c, directional indicators, rear combination light, etc. (not shown), a forward-surveillance stereo camera 137d, a lateral surveillance camera 137e, etc. The unmanned delivery vehicle 130 has six housings 133 on both sides of the vehicle in the case shown, each housing 133 being capable of loading into and unloading from inside by opening or closing each door 133a.

Figure 19:
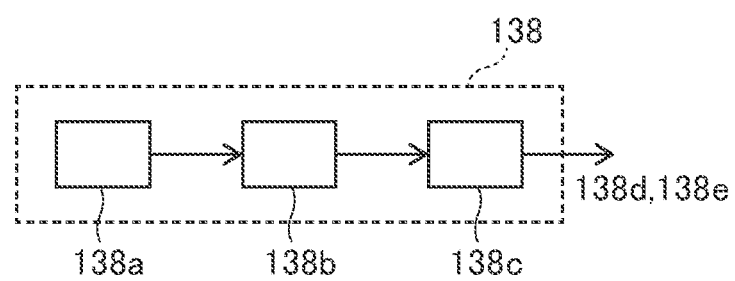
FIG. 19 is a block diagram showing a typical configuration of an identification means of the unmanned delivery vehicle as shown in FIG. 17.

An identification means 138 for reading the identification information 126b of the shipping box 126 is provided adjacent to the conveyance route. For example, the identification means 138 is installed on the conveyer belt 127 near a place where the housing 133 of the unmanned delivery vehicle 130 is arranged, or within the housing of the unmanned delivery vehicle 130. In the case shown, the identification means 138 is provided on the surface of the shipping box 126 in each housing 133 of the unmanned delivery vehicle 130. As shown in FIG. 19, the identification means 138 comprises: an imaging camera 138a for shooting the inside of the housing 133; an image processing unit 138b for extracting the identification information 126b from the imaging information of the imaging camera 138a by image identification; and a discriminating unit 138c. The discriminating unit 138c is configured to judge whether the item 121 within the shipping box 126 loaded onto the housing 133 is corresponding to the ordered item 162c contained in the product delivery information 144, namely whether the item is the one to be loaded onto the unmanned delivery vehicle 130, by checking the identification information 126b extracted from the image processing unit 138b against the product delivery information 144.

After the shipping box 126 is loaded onto the housing 133, the identification means 138 identifies the identification information 126b that has been attached to the shipping box 126, and judges whether the item 121 in the shipping box 126 is the correct one or not. The identification means 138 transmits a positive discriminant information 138d, when a correct item 121 is inside the shipping box 126, and transmits a negative discriminant information 138e, judging the loading to be incorrect, when an incorrect item 121 is inside the shipping box 126, to the control unit 132 of the unmanned delivery vehicle 130. When the control unit 132 of the unmanned delivery vehicle 130 receives the positive discriminant information 138d, the delivery is continued, the door 133a of the housing 133 is closed, and then the vehicle moves toward the delivery address 162d. When the control unit 132 of the unmanned delivery vehicle 130 receives the negative discriminant information 138e, the negative discriminant information 138e is transmitted to the management center 140 via the network 150, the delivery of the shipping box 126 is suspended, and thus incorrect delivery is prevented without fail.

One housing 133 is selected to load the shipping box 126 to the housing 133 for one delivery address 162d. When only one housing 133 is not sufficient to house shipping boxes 126 intended for one delivery address 162d, two or more housings 133 are selected, and shipping boxes 126 are loaded onto each of them.

Figure 20:
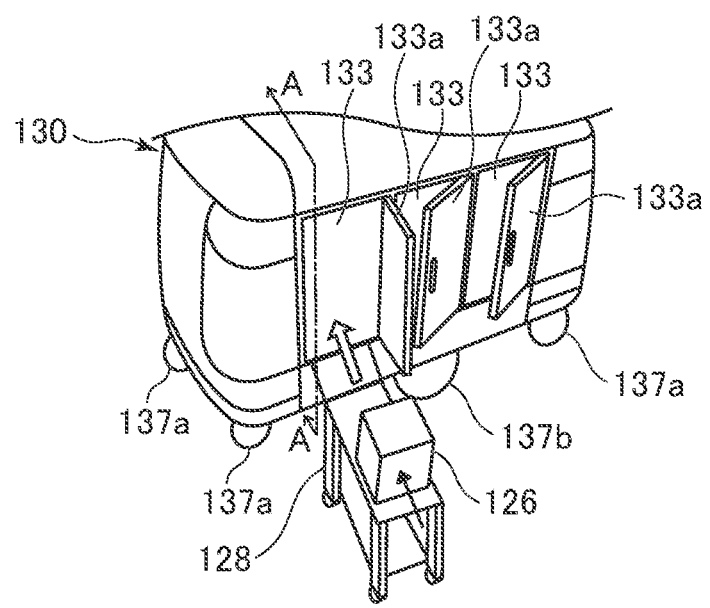
FIG. 20 is a perspective view showing a typical bring-in operation of a shipping box into the housing of the unmanned delivery vehicle as shown in FIG. 18 (A) and FIG. 18 (B).
Figure 21:
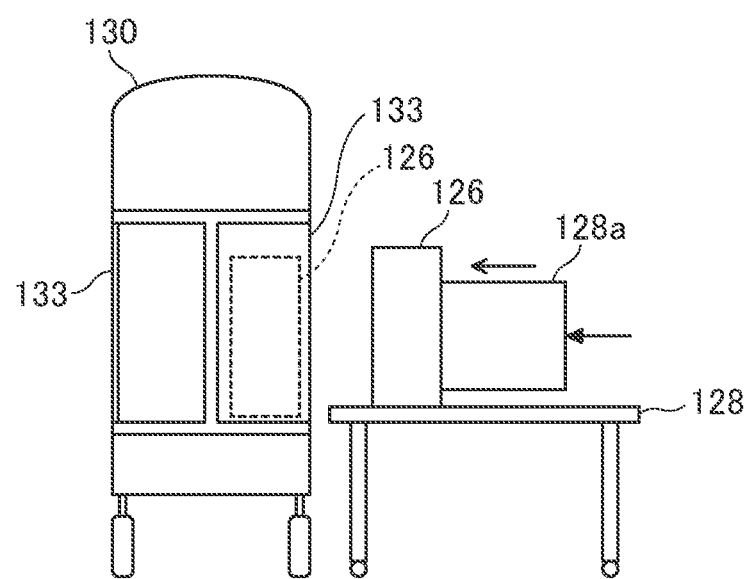
FIG. 21 is a cross-sectional view taken along A-A in FIG. 20.

The loading of the shipping boxes 126 onto the housing 133 of the unmanned delivery vehicle 130 is performed using a transfer means. As shown in FIGS. 20 and 21, the transfer means comprises: a transfer table 128 that can be placed relative to the loading position adjacent to the opening of the housing 133 of the unmanned delivery vehicle 130; and a loading member 128a for pressing the ordered item 121 into the housing 133 of the unmanned delivery vehicle 130 at the loading position. The loading of the shipping box 126 onto the housing 133 is performed as shown in FIGS. 20 and 21. In FIGS. 20 and 21, the unmanned delivery vehicle 130 that has arrived at the specified unmanned store 120 opens the door 133a of a housing 133, and stops so that this opening comes at a position in front of the transfer table 128 to which the shipping box 126 is loaded. The control unit 132 of the unmanned delivery vehicle 130 monitors the positional relation between the transfer table 128 and the opening of the door 133a by using a lateral surveillance camera 138a (FIG. 18(A) and FIG. 18 (B)), thus controlling the running unit 131, so that the opening of the door 133a comes just in front of the transfer table 128. In this state, the shipping box 126 is pressed into the housing 133 using the loading member 128a equipped at the transfer table 128 to automatically load the shipping box 126 into the housing 133.

Figure 22:
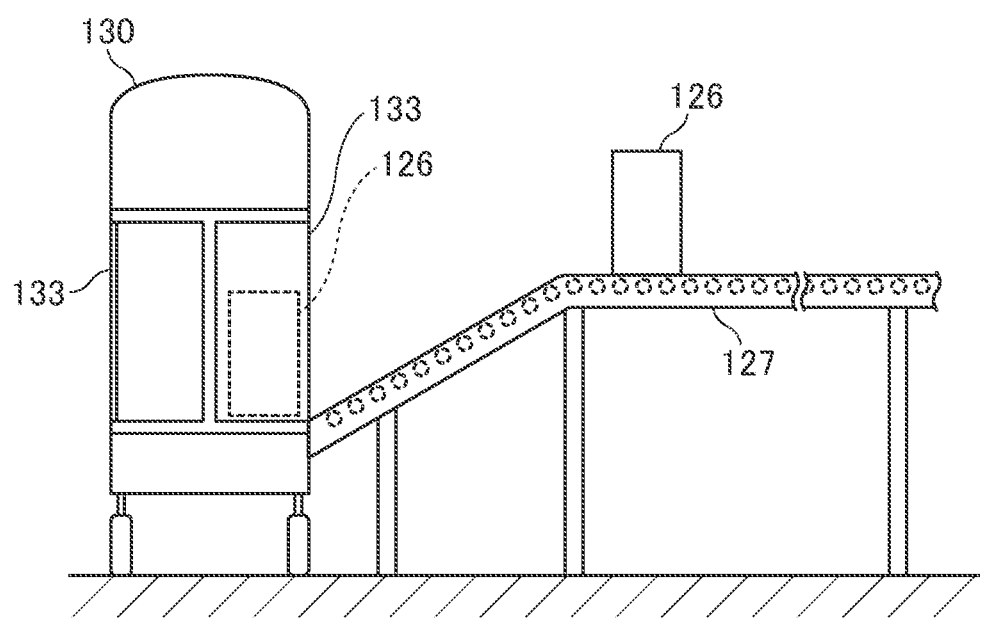
FIG. 22 is a cross-sectional view showing another example of bring-in of the shipping box into the housing of the unmanned delivery vehicle.

FIG. 22 is a cross-sectional view showing another state of bringing in of a shipping box 126 into the housing 133 of an unmanned delivery vehicle 110. As shown in FIG. 22, the shipping box 126 is placed into the housing 133 of the unmanned delivery vehicle 110 as follows: the ordered item 121 is transferred on a conveyer belt 127 into the shipping box 126 in advance, and the shipping box 126 is made to flow into the housing 133 from the roller of the slanting conveyer belt 127. The control unit 132 of the unmanned delivery vehicle 130 monitors the positional relation between the edge of the slanting conveyer belt 127 and the opening of the door 133a by using a lateral surveillance camera 138a (FIG. 18 (A) and FIG. 18 (B)), thus controlling the running unit 131, so that the opening of the door 133a comes just in front of the edge of the conveyer belt 127. The shipping box 126 can thus be automatically loaded onto the housing 133. The another identification means 138 different from the identification means 138 mounted within the housing 133 of the unmanned delivery vehicle 110 may be provided adjacent to the conveyance route. For example, the another identification means 138 may be installed adjacent to the flat part of the slanting conveyer belt 127.

The identification means 138 identifies the identification information 126b of the shipping box 126 that has been loaded onto the housing 133, judges whether the item 121 within the shipping box 126 is the one that should be loaded onto the housing 133 of the unmanned delivery vehicle 130.

The identification means 138 outputs the positive discriminant information 138d or the negative discriminant information 138e to the control unit 132 of the unmanned delivery vehicle 130. If the positive discriminant information 138d is received, the control unit 132 of the unmanned delivery vehicle 130 continues the delivery operation, closing the door 133a of the housing 133 first, and allows the unmanned delivery vehicle 130 to travel toward the delivery address 162d. Meanwhile, when the negative discriminant information 138e is received, the control unit 132 of the unmanned delivery vehicle 130 transmits the negative loading information 138e to the management center 140 via the network 150, and waits for taking out of the shipping box 126.

The control unit 132 allows the unmanned delivery vehicle 130 to autonomously travel on the road based on the detection signals from the forward-surveillance stereo camera 137d, the lateral surveillance camera 137e, etc. and the map data created in advance. The management center 140 detects the operation status of the unmanned delivery vehicle 130, namely "during waiting", "during delivering" and "during returning" based on the notice of commencement of delivery 132a and the delivery completion notice 132c transmitted from each unmanned delivery vehicle 130 together with the vehicle identification information 135, and creates vehicle status information 139. Receiving the negative discriminant information 138e from the unmanned delivery vehicle 130, the management center 140 transmits the negative discriminant information 138e to the unmanned store 120.

Figure 23:
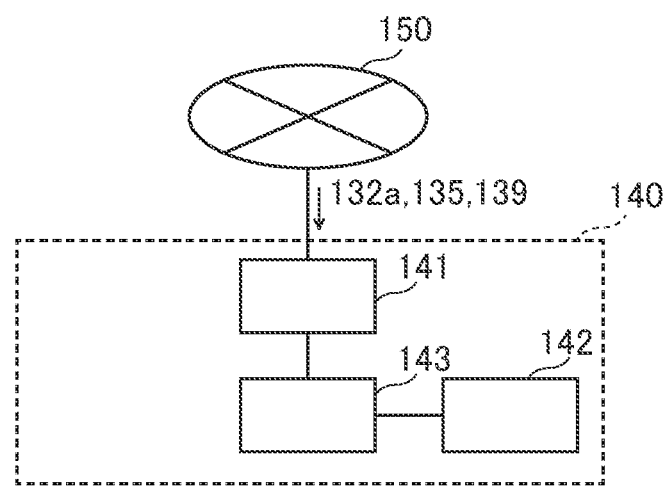
FIG. 23 is a block diagram showing a configuration of the management center as shown in FIG. 11.

The management center 140 is configured in the same manner as the management center 50 as shown in FIG. 8, and as shown in FIG. 23, comprises: a transceiver 141; a memory unit 142; and a control unit 143. Processing by the management center 140 is also performed by using computers such as program-controlled workstation, server, and cloud server etc. as in the case of the management center 50 as shown in FIG. 8.

The transceiver 141 of the management center 140 is connected via the network 150 to the store terminal equipment 122 of the unmanned store 120, the control unit 132 of each unmanned delivery vehicle 130, and the user terminal equipment 161 of the user 160 so that communication among them is established.

The transceiver 141 of the management center 140 receives the product inventory information 121a from each unmanned store 120 via the network 150, registers the information in the memory unit 142 as a database, and transmits the product inventory information 121a to the control unit 143. The control unit 143 of the management center 140 can thus asses the product inventory information 121a regarding the goods 121 at all unmanned stores 120 under control at all times, thus ensuring centralized control.

The transceiver 141 of the management center 140 receives, via the network 150, the vehicle status information 139 showing the state of the unmanned delivery vehicle 130, namely "during waiting", "during delivering" or "during returning" from individual unmanned delivery vehicles 130, registers the information into the memory unit 142 as the database, and transmits the vehicle status information 139 to the control unit 143. The control unit 143 of the management center 140 can thus assess the states of all the unmanned delivery vehicles 130 under control, thus ensuring centralized control.

Receiving the product order information 162 of the user 160 from the store terminal equipment 122 of the unmanned store 120 via the network 150, the transceiver 141 of the management center 140 registers the product order information 162 to the memory unit 142, and outputs the product order information 162 to the control unit 143. The control unit 143 of the management center 140 selects an unmanned store 120 that has the ordered item 162c in stock and is close to the delivery address 162d from the product order information 162 including the order code 162a, the user information 162b, the ordered item 162c, and the delivery address 162d based on the product inventory information 121a, and selects an unmanned delivery vehicle 130 that is nearest to the selected unmanned store 120 based on the vehicle status information 139.

The control unit 143 of the management center 140 creates the product delivery information 144 that contains the selected unmanned store 120, the user information 162b, the ordered item 162c, and the delivery address 162d, and transmits the product delivery information 154 to the selected unmanned store 120 and the unmanned delivery vehicle 130 via the network 150.

Receiving the negative discriminant information 138e from the unmanned delivery vehicle 130 via the network 150, the control unit 143 of the management center 140 transmits the negative discriminant information 138e to the related unmanned store 120. The store terminal equipment 122 of the unmanned store 120 then stops loading of the shipping box 126 onto the unmanned delivery vehicle 130, and takes out the ordered item 162c from the housing 133.

Figure 24:
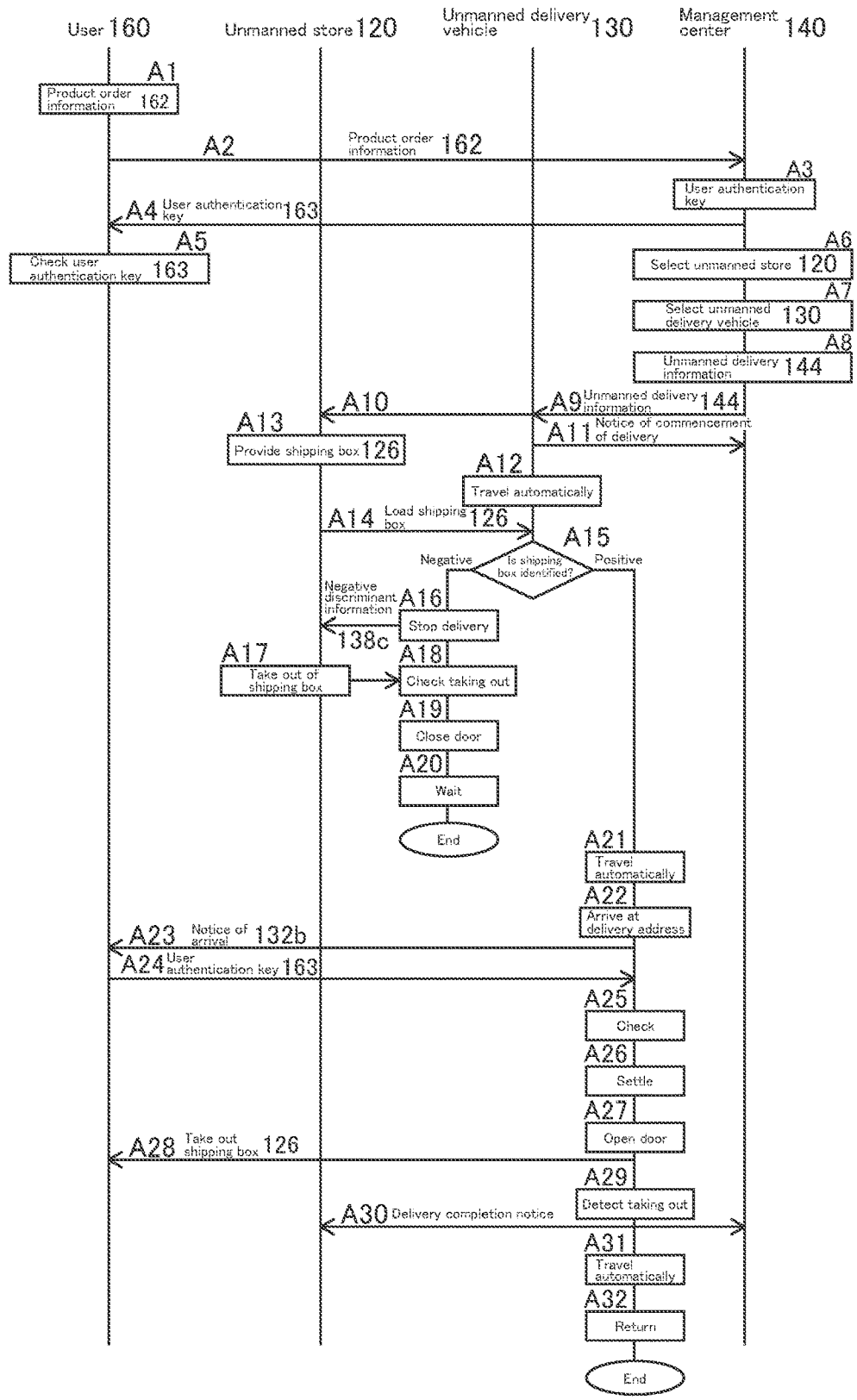
FIG. 24 is a flow chart sequentially showing unmanned delivery operation in the case where a user directly orders goods to a management center by using user terminal equipment.

The unmanned delivery system 100 according to the present invention operates as shown in the flow chart in FIG. 24. A case where a user 160 directly places an order for goods to the management center 140 using the user's own user terminal equipment 161 will hereinafter be described according to the flow chart. In the flow chart in FIG. 24, the user 160 creates a product order information 162 by using the user's own user terminal equipment 161 in step A1, and in step A2, transmits the product order information 62 to the management center 140 via the network 150.

In step A3, the control unit 143 of the management center 140 issues a user authentication key 163 regarding this product order information 162, and in step A4, transmits this user authentication key 163 to the user terminal equipment 161 of the user 160 via the network 150. In step A5, the user 160 can check the user authentication key 163 by visually checking the user authentication key 163 displayed on the screen of the user's own user terminal equipment 162.

In step A6, the control unit 143 of the management center 140 selects an automatic product collection point where the ordered item 162c contained in the product order information 162 is in stock and is close to the delivery address 162d by referring to the product inventory information 121a, and then in step A7, selects an unmanned delivery vehicle 130 that is nearest to the selected unmanned store 120 by referring to the vehicle status information 139.

In step A8, the control unit 143 of the management center 140 creates product delivery information 144 that contains the selected unmanned store 154a, the unmanned delivery vehicle 130, the user information 162b, the ordered item 162c, and the delivery address 162d. In step A9, the control unit 143 transmits the product delivery information 144 to the selected unmanned delivery vehicle 130, and at the same time transmits the product delivery information 144 to the selected automatic product collection point in step A10. In step A11, receiving the product delivery information 144, the control unit 132 of the unmanned delivery vehicle 130 transmits the notice of commencement of delivery 132a and the vehicle identification information 135 to the management center 140 via the network 150, and in step A12, controls the running unit 131 based on this product delivery information 144 to autonomously travel to the selected unmanned store 120.

Meanwhile, receiving the product delivery information 144, the store terminal equipment 122 of the unmanned store 120 performs picking and packing of the ordered item 162c based on the product delivery information 144, attaches a shipping slip 126a to the shipping box 126, prepares a shipping box 126 that contains the item 121 corresponding to the ordered item 162c, and waits for the arrival of the unmanned delivery vehicle 130 that is in charge of the delivery of the ordered item 162c in step A13. On arrival of the unmanned delivery vehicle 130 at the unmanned store 120 and the opening of the door 133a of the housing 133 to which the item is to be loaded, the store terminal equipment 122 of the unmanned store 120 loads the shipping box 126 that contains the item 121 corresponding to the ordered item 162c onto the housing 133 of the unmanned delivery vehicle 130 in step A14.

After the shipping box 126 is loaded, the identification means 138 of the unmanned delivery vehicle 130 shoots an image of the shipping box 126 that has been loaded, identifies the identification information 126b of the shipping box 126, judges whether the item 121 within the shipping box is the one to be loaded onto the housing 133 of the unmanned delivery vehicle 130, and outputs the positive discriminant information 138d or the negative discriminant information 138e in step A15.

If the negative discriminant information 138e is received, in step A16, the unmanned delivery vehicle 130 suspends the delivery operation, assuming incorrect loading of the shipping box 126, and in step A17, the store terminal equipment 122 of the unmanned store 120 takes out the shipping box 126 that has been loaded onto the housing 133 of the unmanned delivery vehicle 130 based on the negative discriminant information 138e. In step A18, the control unit 132 of the unmanned delivery vehicle 130 confirms that the shipping box 126 has been taken out of the housing 133. Then in step A19, closes the door 133a of the housing 133, and stands by at a standby location near the unmanned store 120 in step A20, completing the delivery operation. If the ordered item 121 is loaded improperly, the transfer means takes out the ordered item 121 already loaded from the housing 133 of the unmanned delivery vehicle 130, and post-processing of improper loading can thus be performed automatically.

If the positive discriminant information 138d is received, the control unit 133 of the unmanned delivery vehicle 130 closes the door 133a of the housing 133 in step A21, and autonomously travels toward the delivery address 162d. On arrival of the unmanned vehicle 130 at the delivery address 162d in step A22, the control unit 132 of the unmanned delivery vehicle 130 transmits a notice of arrival 132b to the user terminal equipment 161 of the user 160 via the network 150 in step A23. In step A24, the user 160 who has received the notice of arrival 132b enters the user authentication key 163 to the control unit 132 of the unmanned delivery vehicle 130 at the delivery address 162d, and the control unit 132 of the unmanned delivery vehicle 130 checks the user information 162b contained in the product delivery information 144 against the user authentication key 163 in step A25. If they match, the payment for the ordered item 162c is made at the settlement unit 134 in step A26, and in step A27, the door 133a of the housing 133 is opened, and the shipping box 126 is handed over to the user 160.

After the user 160 takes the shipping box 126 out of the opened housing 133 in step A28, the control unit 132 of the unmanned delivery vehicle 130 detects vacancy of the housing 133 in step A29, closes the door 133a of the housing 133, assuming that the delivery of the shipping box 126, namely the item 121 corresponding to the ordered item 162c, has been completed, transmits the delivery completion notice 132c and the vehicle identification information 135 to the management center 140 via the network 150 in step A30, controls the running unit 131 to autonomously travel to the unmanned store 120 to which the vehicle belongs or to a nearby unmanned store 120 in step A31, and in step A32, returns to the vehicle waiting area of the unmanned store 120, etc. The delivery of the item 121 corresponding to the ordered item 162c ordered by the user 160 to the delivery address 162d and the return of the vehicle have thus been completed.

Thus, the user 160 can directly place the order for goods to the management center 140 via the network 150 at the arbitrary location without visiting the unmanned store 120, and can receive the item 121 corresponding to the ordered item 162c at the delivery address 162d.

In the above case, the shipping box 126 that contains goods is housed in one housing 133, and the delivery is made to one delivery address 162d. However, it is also possible to house shipping boxes 126 bound for various delivery addresses 162d in each housing 133, and make deliveries by sequentially visiting a plurality of delivery addresses 162d by one delivery operation. By visiting two or more delivery addresses 162d in one delivery operation, thus delivering the plurality of ordered items at one delivery operation, the delivery efficiency can be improved further.

(Tracking of the Process from Order Placement to Delivery)

Figure 25:
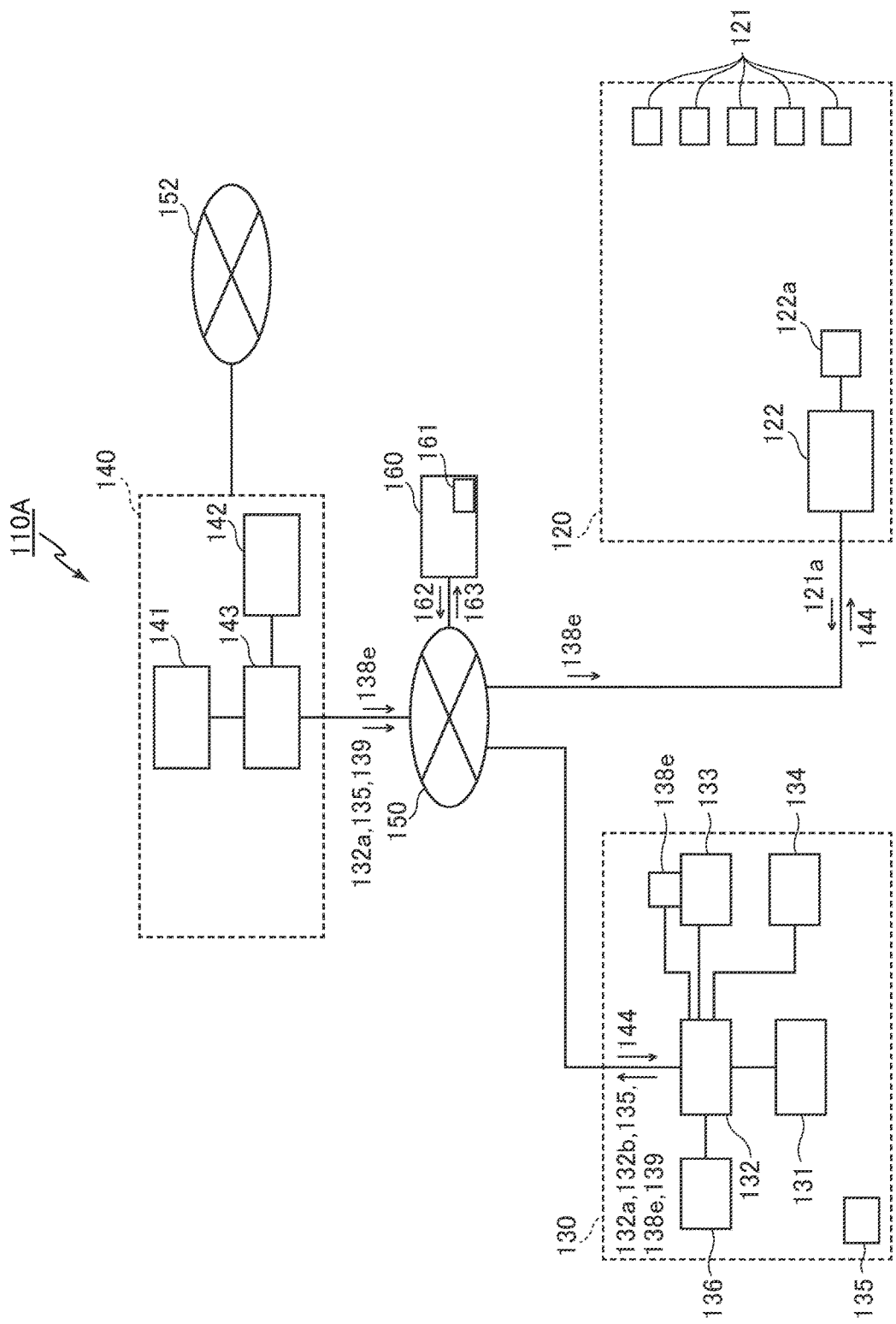
FIG. 25 is a schematic view showing the entire configuration of a modification of the unmanned delivery system by unmanned delivery vehicle according to the present invention.

A modification of the unmanned delivery system of the present invention, which tracks the process from order placement to delivery, will then be described. FIG. 25 shows the entire configuration of a modification of the unmanned delivery system by the unmanned delivery vehicle according to the present invention, and FIG. 26 is a flow chart sequentially showing the tracing operation of delivery of the case where the user 160 directly places an order to the management center 140 by using user terminal equipment 161 with the unmanned delivery system 110A shown in FIG. 25.

As shown in FIG. 25, the user terminal equipment 161 used by the user 60 is connected to the management center 140 via the network 150. The unmanned delivery system 110A as shown in FIG. 25 differs from the unmanned delivery system 100 as shown in FIG. 10 in that the management center 140 can be further connected to a specific network 152 for recording the specific pieces of information ranging from the placement of an order for goods 121 by the user 160 to delivery by associating them with each other. The specific network 152 may be configured as a specific network connected to a local server via a network or as a blockchain network for example. In FIG. 25, a blockchain network 152 is connected to the network 150 via the management center 140. As the network 150, a dedicated line or general public line can be used.

The specific network 152 using the blockchain technology can be configured by using technologies such as Ethereum (Patent Literature 2), open-source Hyperledger, Hyperledger Fabric by IBM, Hyperledgerlroha by SORAMITSU, Hyperledger Sawtooth by Intel, Hyperledger Burrow by Monax, and Hyperledger Indy by Sovrin Foundation for example. Since other structure is the same as the unmanned delivery system 110 by the unmanned delivery vehicle as shown in FIG. 10, the description will be omitted.

Figure 26:
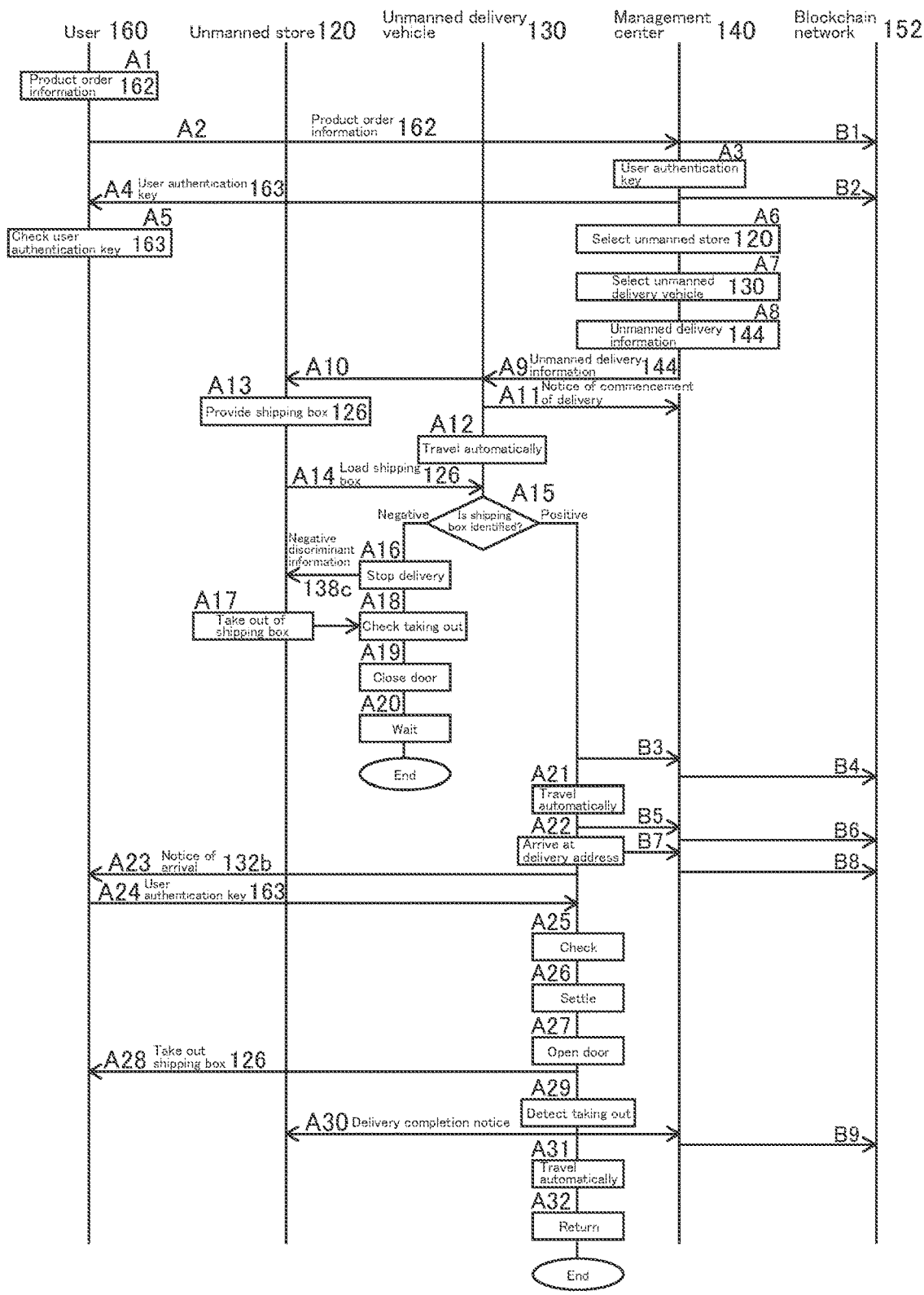
FIG. 26 is a flow chart sequentially showing the tracking operation of delivery in the case where the user directly orders goods to the management center by using the user terminal equipment in the unmanned delivery system in FIG. 25.

The flow chart in FIG. 26 shows an example where each process of (a) accepting an order, (b) preparing for a delivery, (c) during delivering, and (d) completing the delivery is recorded in the blockchain network 152 when a user 160 directly places an order for goods 121 to the management center 140 by using user terminal equipment 161 with the unmanned delivery system as shown in FIG. 25. Since steps from A1 to A32 are the same as those in the flow chart in FIG. 24, the description will be omitted.

(Acceptance of Orders)

The management center 140 associates product order information 162 received from the user in step A2 with the information contained in the user authentication key 163 notified to the user 160 in step A3. After step A3 is completed, the management center 140 transmits the product order information 162 to a blockchain network 152 in step B1, and in step B2, transmits the user authentication key 163 to the blockchain network 152. Consequently, the order information such as the product order information 162 and the user authentication key 163 is thus recorded in the blockchain network 152.

The information transmitted to the blockchain network 152 may include not only the product order information 162 and user authentication key 163 but also the time of order placement by the user 160, the positional information of the user, and the predicted delivery time based on the positional information. The positional information of the user 160 may be acquired based on the positional information of the GPS embedded in the user terminal equipment 161.

(Preparation for Delivery)

After the unmanned delivery vehicle 130 is selected in step A7 and before the autonomous driving of the unmanned delivery vehicle 130 is started in step A21, the management center 140 allows the unmanned delivery vehicle 160 to notify the blockchain network 152 of the completion of preparation for delivery in step B3, and then in step B4, transmits the completion of preparation for delivery to the blockchain network 152. Consequently, the completion of preparation for delivery, including the time of completion of preparation for delivery, is recorded in the blockchain network 152.

In step B4 described above, in addition to the information that preparation for delivery has been completed, the vehicle number of the unmanned delivery vehicle 130, the identification information of the shipping box 126, positional information of the unmanned delivery vehicle 130, and the time of delivery predicted from the positional information may be included.

(During Delivery)

After the commencement of autonomous driving in step A21, the unmanned delivery vehicle 130 notifies the management center 140 of the commencement of autonomous driving in step B5. This notification includes the time of commencement of autonomous driving of the unmanned delivery vehicle 130, etc. Then in step B6, the management center 140 transmits the information that the unmanned delivery vehicle 130 has started autonomous driving toward the delivery address to the blockchain network 152 after the commencement of autonomous driving in step A21. Consequently, the information that the goods are being delivered is then recorded in the blockchain network 152.

(Completion of Delivery)

After the arrival at the delivery address in step A22, the unmanned delivery vehicle 130 notifies the management center 140 of the arrival of the vehicle at the delivery address in step B7. This notification includes the time of delivery to the delivery address, etc. Then, in step B8, the management center 140 transmits the information that the unmanned delivery vehicle 130 has arrived at the delivery address to the blockchain network 152. After handing the shipping box 126 over to the user 160 in steps A23 to A30, the unmanned delivery vehicle 130 transmits the delivery completion notice to the management center 140 (see step A30). This notification contains the verification of the unmanned delivery vehicle 130 (see step A25), the settlement (see step A26), the time of completion of delivery, etc. Then in step B9, the management center 140 transmits the information that the delivery by the unmanned delivery vehicle 130 has been completed to the blockchain network 152. Consequently, the completion of delivery of the ordered item is then recorded in the blockchain network 152.

After step B8 described above, the unmanned delivery vehicle 130 may notify the management center 140 of the information concerning the temperature and the humidity acquired by the temperature sensor and/or the humidity sensor embedded in the shipping box 126 together with the user authentication key 163 shown by the user 160. For example, when a refrigerant or a heat insulating material is contained in the shipping box 126 to keep the temperature of the ordered item, the management center 140 may notify the blockchain network 52 of the information concerning the temperature and the humidity in the shipping box 126.

In the management center 140, whether the ordered item contained in the shipping box 126 should be delivered to the user 160 or not may be judged based on the information concerning the temperature or the humidity in the shipping box 126. Finding that the temperature etc. of the ordered item in the shipping box 126 has exceeded the temperature etc. setting during delivery, the management center 140 judges that the item cannot be delivered to the user 160. In this case, the unmanned delivery vehicle 130 is notified of the suspension of delivery to the user 160, and the user 160 may be notified of redelivery and expected time of redelivery.

(Visualization of the Process from the Order Placement to the Delivery)

Figure 27A:
FIG. 27 (A) to (E) are charts showing screens for tracking of delivery in the management center, where FIG. 27 (A) shows the state before receipt of an order, FIG. 27 (B) the state when the order is received, FIG. 27 (C) the state when preparation is being made, FIG. 27 (D) the state during delivery, and FIG. 27 (E) the state when the delivery is completed.
Figure 27B:
Figure 27C:
Figure 27D:
Figure 27E:

FIG. 27 (A) to FIG. 27 (E) show screens for tracking delivery in the management center 140, where FIG. 27 (A) shows the state before the order is received, FIG. 27(b) the state when the order is received, FIG. 27 (C) the state of preparing for delivery, FIG. 27 (D) the state during delivery, and FIG. 27 (E) the state of completion of delivery. As shown in FIG. 27 (A), to display the progress of delivery process, "Receiving order" (1), "Preparing for delivery" (2), "During delivering" (3), and "Delivery completed" (4) are shown from left to right at the top of the screen, with the "Order being received" display only shown bright, and others shown dark, to visualize the delivery process, thus allowing the manager to know that the delivery is in the process of "Receiving order". The details of visualization may be stored in the memory unit 142 of the management center 140, if necessary, allowing browsing on the display or by using the user terminal equipment 161 owned by the user 160, etc.

As shown in FIG. 27 (B), when an order has been received, the circle above "Receiving order" of the progress state of delivery process, is checked and shown bright, and "Order received" and its description "Order has been received. Preparation for delivery is in progress." are also displayed.

When preparation for delivery is in progress, the circle above "Preparing for delivery" (2) is additionally checked and shown bright, as shown in FIG. 27 (C), and furthermore, "Preparing for delivery" and its description "Product is being loaded onto unmanned delivery vehicle." are displayed. Consequently, it is shown that the delivery process has moved from "Receiving order" (1) to "Preparing for delivery" (2).

During delivery, as shown in FIG. 27 (D), the circle above "Delivering" (3) is additionally checked, shown bright, and furthermore, "Delivering" and its description "Product is being delivered." are displayed. Consequently, it is shown that the delivery process has moved from "Preparing for delivery" (2) to "Delivering" (3).

When the delivery is completed, the circle above "Delivery completed" (4) is additionally checked, shown bright, as shown in FIG. 27 (E), and "Delivery completed" and its description "Delivery has been completed. Item has arrived at delivery address" are displayed. Consequently, it is shown that the delivery has been completed.

As shown in FIG. 27 (A) to FIG. 27 (E), visualized details may be stored in the memory unit 142 of the management center 140, and browsed as required using the display, etc. Consequently, the record in each stage ranging from the receipt of the order to the completion of delivery notified to the blockchain network 152 can be visualized, and at the same time, the manager and the user 160 are allowed to know the delivery status easily.

According to the unmanned delivery system 110A, the records in each stage ranging from the receipt of the order to the completion of delivery, including the information on the order for goods, the time of completion of preparation for delivery, the time of commencement of autonomous driving of the unmanned delivery vehicle 130, the time of arrival of the unmanned delivery vehicle at the delivery address, and the time of completion of delivery, are stored in the blockchain network 152. Since the data in the blockchain network 152 cannot be altered because it is protected by secure encryption, and also it is possible to monitor whether the alteration is being made or not, highly reliable delivery service is ensured.

Furthermore, since the records by the blockchain network 152 cannot be altered, even if delivery is not completed despite that an order is received, the cause of the trouble can be identified based on the record stored in the blockchain network 152. Consequently, the possibility of tracing (traceability) and the reliability of the delivery service of the unmanned delivery system 110A by the unmanned delivery vehicle can be improved.

The present invention can be executed in various embodiments without departing from the scope of the present invention. For example, the identification information may be in an electronic form such as IC tags. This identification means can identify ordered items by electronically reading the identification information.

The unmanned delivery vehicle 130 is made to wait near the unmanned store 120, but it is apparent that it may be allowed to belong to a vehicle waiting area provided as required, and return to the vehicle waiting area to which it belongs after delivering the item 121 corresponding to the ordered item 162c to the delivery address 162d, or move to the nearest vehicle waiting area or a vehicle waiting are that has only a few unmanned delivery vehicles 30 on standby.

The above embodiments are described, assuming that the automatic product collection point is an unmanned convenience store, but the automatic product collection point may be other unmanned stores such as an unmanned supermarket, or even an unmanned warehouse that has diverse lineup of goods 21 instead of a store.

As the specific network 52 connected to the management center 140, the use of a blockchain network was described. However, the records can be browsed not only by the management center or the user 160 but also by the responsible person of the unmanned store 120, and furthermore by companies related to the unmanned store 20 such as manufacturers that provide goods, sales agents and trading companies that sell the products by the manufacturers, companies that deliver food, transport companies that deliver goods to unmanned stores 120, etc.

REFERENCE SIGN LIST 10, 100, 100A: Unmanned delivery system by unmanned delivery vehicle
20: Stores (Merchandise collection points)
21, 121: goods
21a: Product inventory information
22: Store terminal equipment, 22a: Cash register
30: Warehouses (Merchandise collection points)
31: Warehouse terminal equipment
40: Vehicle waiting area
41: Control unit in the vehicle waiting area
42, 139: Vehicle status information, 50, 140: Management center
51, 141: Transceiver, 52, 142: Memory unit, 53, 143: Control unit
54, 144: Product delivery information
54a: Selected product accumulation point (Selected store)
54b: Selected vehicle waiting area
60, 150: Network, 70, 160: User
71, 162: Product order information, 71a, 162a: Order code
71b, 162b: User information, 71c, 162c: Ordered items
71d, 162d: Delivery address, 72, 161: User terminal equipment
73, 163: User authentication key,
80, 130: Unmanned delivery vehicles
81, 131: Running unit, 82, 132: Control unit
82a: Notice of commencement of delivery, 82b: Notice of arrival
82c: Delivery completion notice, 83, 133: Housing
83a, 133a: Doors, 84, 134: Settlement unit
85, 135: Vehicle identification information
86, 136: Memory unit, 87, 137: Body, 87a: Wheels, 87b, 137c: Lights
87c: Directional indicator, 87d: Rear combination lights
87e, 137d: Forward-surveillance stereo camera
87f, 137e: Lateral surveillance cameras
120: Unmanned stores (Automatic product collection points)
121a: Product inventory information, 122: Store terminal equipment
122a: Self-checkout, 123: Merchandise rack, 124: Rail, 125: Picking robots, 125a: Suction grip hand
126: Shipping boxes, 126a: Shipping slips,
126b: Identification information
127: Conveyer belt, 127a: End of the conveyer belt, 127b: Ramp
128: Transfer table, 128a: Loading member, 129: Packing device
129a: Holding unit, 130: Unmanned delivery vehicle
132a: Notice of commencement of delivery, 132b: Notice of arrival
132c: Delivery completion notice, 133: Housing,
137a: Castor, 137b: Driving wheel
138: Identification means
138a: Imaging camera, 138b: Image processing unit,
138c: Discriminating unit,

138*d*: Positive discriminant information
138*e*: Negative discriminant information
152: Specific network (Blockchain network)

What is claimed is:

1. An unmanned delivery system by unmanned delivery vehicles, comprising:
 a plurality of unmanned delivery vehicles;
 at least one vehicle waiting area to which at least one of the plurality of unmanned delivery vehicles belongs or where at least one of the plurality of unmanned delivery vehicles stands by;
 at least one merchandise collection point;
 a management center that manages an inventory status of individual pieces of goods at the each merchandise collection point as well as the state of the individual unmanned delivery vehicles and unmanned delivery vehicles belonging to the vehicle waiting area; and
 a network that connects the plurality of unmanned delivery vehicles, the vehicle waiting area, the merchandise collection point, and the management center to one another, wherein
 the vehicle waiting area comprises:
 a vehicle waiting area control unit located in the vehicle waiting area,
 the vehicle waiting area control unit is configured to detect each state of a plurality of states of an operation of the unmanned delivery vehicle, wherein the plurality of states includes a waiting state, a during delivering state, a during traveling state, and a during returning state,
 to create a vehicle status information, and
 to transmit the vehicle status information to the management center via the network,
 wherein the vehicle waiting area control unit detects each state of the operation of each unmanned delivery vehicle based on a notice of commencement of delivery and a delivery completion notice transmitted from each unmanned delivery vehicle together with vehicle identification information, creates the vehicle status information, and transmits the vehicle status information for each unmanned delivery vehicle to the management center via the network, wherein
 the merchandise collection point comprises:
 a store terminal equipment, wherein the store terminal equipment transmits an inventory status of an item at a store to the management center as a product inventory information via the network,
 wherein
 the management center is configured to select, based on a product order information including an ordered item from a user and a delivery address, a merchandise collection point and the vehicle waiting area for delivering the ordered item in accordance with the inventory status of the ordered item and a location of the delivery address,
 select an unmanned delivery vehicle that is on standby at the selected vehicle waiting area or is traveling, and
 transmit a product delivery information, including the merchandise collection point where the ordered item is to be picked up, the unmanned delivery vehicle, and the delivery address, to the unmanned delivery vehicle and the selected merchandise collection point via the network,
 the unmanned delivery vehicle comprises:
 a running unit;
 an unmanned delivery vehicle control circuitry configured to
 receive the product delivery information from the management center via the network;
 record the product delivery information to a memory unit; and
 control the running unit to travel to the merchandise collection point selected based on the product delivery information stored in the memory unit; and
 a housing that can house the ordered item, wherein
 the unmanned delivery vehicle is configured to autonomously travel to the merchandise collection point contained in the product delivery information, load the ordered item at the merchandise collection point, and then autonomously travel to the delivery address, and wherein
 the unmanned delivery vehicle is configured to notify the user of the arrival, or expected time of arrival, at the time of or before arrival at the delivery address,
 wait for the check for the ordered item by the user and delivery, and
 autonomously travel to a position of any vehicle waiting area or the next delivery address instructed by the management center after the check for the ordered item by the user and delivery are completed.

2. The unmanned delivery system by unmanned delivery vehicles as set forth in claim 1, wherein
 the merchandise collection point is provided at two or more locations, and
 the management center is configured to select a merchandise collection point where the ordered item is in stock based on each position of the unmanned delivery vehicle in charge of delivery, the selected merchandise collection point, and the delivery address so that delivery distance and delivery time become short.

3. The unmanned delivery system by unmanned delivery vehicles as set forth in claim 1, wherein
 the merchandise collection point is provided at two or more locations; and
 the management center is configured to select a vehicle waiting area where the unmanned delivery vehicle in charge of delivery is on standby based on each position of the vehicle waiting area to which the unmanned delivery vehicle in charge of delivery belongs, the selected merchandise collection point, and the delivery address so that delivery distance and delivery time become short.

4. The unmanned delivery system by unmanned delivery vehicles as set forth in claim 1, wherein
 when no unmanned delivery vehicle is available in one vehicle waiting area, the management center is configured to select a vehicle waiting area that has an unmanned delivery vehicle capable of making delivery to the delivery address earlier by comparing the waiting time and delivery time of an unmanned delivery vehicle that is in the process of delivery and returns to the vehicle waiting area earliest after delivery with the delivery time of unmanned delivery vehicles in other vehicle waiting areas.

5. The unmanned delivery system by unmanned delivery vehicles as set forth in claim 1, wherein the housing of the unmanned delivery vehicle comprises a plurality of separate housing boxes, and given an instruction from the management center during traveling, the unmanned delivery vehicle having an empty housing box is configured to pick an ordered item from the merchandise collection point, and deliver the ordered item by placing the item in the empty housing box.

6. The unmanned delivery system by unmanned delivery vehicles as set forth in claim 1, wherein the merchandise collection point is a store for selling goods, and in response to an order placed by the user at the store, the store terminal equipment is configured to create the product order information for the item ordered by the user, and transmit the product order information to the management center via the network.

7. The unmanned delivery system by unmanned delivery vehicles as set forth in claim 1, wherein the user creates the product order information by using a user terminal equipment, and transmits the product order information to the management center via the network.

8. The unmanned delivery system by unmanned delivery vehicles as set forth in claim 1, wherein a notification of arrival, or an expected time of arrival, of the unmanned delivery vehicle at the delivery address is made to a user terminal equipment of the user via the network.

9. The unmanned delivery system by unmanned delivery vehicles as set forth in claim 1, wherein the unmanned delivery vehicle is configured to travel to a nearest vehicle waiting area or a vehicle waiting area that has a few unmanned delivery vehicles on standby after delivery is completed.

10. An unmanned delivery system by unmanned automatic delivery vehicles as set forth in claim 1, wherein the merchandise collection point is an automatic product collection point for automatically picking a piece of goods ordered by a user, wherein
the unmanned delivery vehicle for loading the ordered item picked from a merchandise rack of the automatic product collection point via a transfer means is arranged adjacent to the transfer means,
the ordered item is provided with unique identification information,
an identification means for identifying the identification information of the ordered item is provided adjacent to a conveyance route of the ordered item and
the identification means is configured to identify the identification information of the ordered item to judge whether the ordered item is the one that should be loaded onto the unmanned delivery vehicle or not.

11. The unmanned delivery system by unmanned delivery vehicles as set forth in claim 10, wherein the transfer means comprises: a transfer rack that can be placed at a position relative to the loading position adjacent to an opening of the housing of the unmanned delivery vehicle.

12. The unmanned delivery system by unmanned delivery vehicles as set forth in claim 10, wherein
the identification information is an identification display attached to the surface of the ordered item; and
the identification means comprises: an imaging means for imaging the identification display of the ordered item; an image processing unit for extracting the identification display based on the image data taken by the imaging means; and comparing the item with the product delivery information based on the identification display extracted by the image processing unit.

13. The unmanned delivery system by unmanned delivery vehicles as set forth in claim 12, wherein the imaging means of the identification means is arranged within the housing so as to take an image of the identification display of the ordered item to be loaded onto the housing of the unmanned delivery vehicle.

14. The unmanned delivery system by unmanned delivery vehicles as set forth in claim 12, wherein the imaging means of the identification means is arranged adjacent to the transfer means or on the transfer rack so as to take an image of the identification display of the ordered item to be transferred into the housing of the unmanned delivery vehicle.

15. The unmanned delivery system by unmanned delivery vehicles as set forth in claim 10, wherein the unmanned delivery vehicle is configured to suspend the delivery of the ordered item, when the identification means judges that the ordered item is not the one to be loaded onto the unmanned delivery vehicle, based on the result of the judgment.

16. The unmanned delivery system by unmanned delivery vehicles as set forth in claim 10, wherein the transfer means is configured to unload the item that has been loaded, when the identification means judges that the item is not the one to be loaded onto the unmanned delivery vehicle, based on the result of the judgment.

17. The unmanned delivery system by unmanned delivery vehicles as set forth in claim 1, wherein the system is provided with a specific network that is connected to the management center and the specific network is configured to record specific pieces of information ranging from placement of an order for goods to delivery by associating them with one another.

18. The unmanned delivery system by unmanned delivery vehicles as set forth in claim 17, wherein the specific network is a blockchain network.

19. The unmanned delivery system by unmanned delivery vehicles as set forth in claim 1, wherein the merchandise collection point is a store for selling goods.

20. The unmanned delivery system by unmanned delivery vehicles as set forth in claim 1, wherein the merchandise collection point is a warehouse for storing goods.

21. The unmanned delivery system by unmanned delivery vehicles as set forth in claim 20, wherein the warehouse is arranged dispersedly in response to the plurality of stores.

22. The unmanned delivery system by unmanned delivery vehicles as set forth in claim 1, wherein the unmanned delivery vehicle returns to the vehicle waiting area to which it belongs after delivery is complete.

23. The unmanned delivery system by unmanned delivery vehicles as set forth in claim 1, wherein the unmanned delivery vehicle does not belong to a specific vehicle waiting area and travels to the nearest vehicle waiting area or the vehicle waiting area having the least amount of unmanned delivery vehicles on standby after deliver is complete.

24. An unmanned delivery system by unmanned delivery vehicles, comprising:
a plurality of unmanned delivery vehicles;
at least one vehicle waiting area to which at least one of the plurality of unmanned delivery vehicles belongs or where at least one of the plurality of unmanned delivery vehicles stands by;
at least one merchandise collection point;
a management center that manages an inventory status of individual pieces of goods at the each merchandise collection point as well as the state of the individual unmanned delivery vehicles and unmanned delivery vehicles belonging to the vehicle waiting area; and
a network that connects the plurality of unmanned delivery vehicles, the vehicle waiting area, the merchandise collection point, and the management center to one another, wherein
the vehicle waiting area comprises:
a vehicle waiting area control unit located in the vehicle waiting area,
the vehicle waiting area control unit is configured to detect each state of a plurality of states of an operation of the unmanned delivery vehicle, wherein the plurality of states includes a waiting state, a during delivering state, a during traveling state, and a during returning state,
to create a vehicle status information, and
to transmit the vehicle status information to the management center via the network,
wherein the vehicle waiting area control unit detects each state of the operation of each unmanned delivery vehicle based on a notice of commencement of delivery and a delivery completion notice transmitted from each unmanned delivery vehicle together with vehicle identification information, creates the vehicle status information, and transmits the vehicle status information for each unmanned delivery vehicle to the management center via the network, wherein
the merchandise collection point comprises:
a warehouse terminal equipment, wherein the warehouse terminal equipment creates the product inventory information and transmits the product inventory information to the management center via the network,
wherein
the management center is configured to select, based on a product order information including an ordered item from a user and a delivery address, a merchandise collection point and the vehicle waiting area for delivering the ordered item in accordance with the inventory status of the ordered item and a location of the delivery address,
select an unmanned delivery vehicle that is on standby at the selected vehicle waiting area or is traveling, and
transmit a product delivery information, including the merchandise collection point where the ordered item is to be picked up, the unmanned delivery vehicle, and the delivery address, to the unmanned delivery vehicle and the selected merchandise collection point via the network,
the unmanned delivery vehicle comprises:
a running unit;
an unmanned delivery vehicle control circuitry configured to
receive the product delivery information from the management center via the network;
record the product delivery information to a memory unit; and
control the running unit to travel to the merchandise collection point selected based on the product delivery information stored in the memory unit; and
a housing that can house the ordered item, wherein
the unmanned delivery vehicle is configured to autonomously travel to the merchandise collection point contained in the product delivery information, load the ordered item at the merchandise collection point, and then autonomously travel to the delivery address, and wherein
the unmanned delivery vehicle is configured to notify the user of the arrival, or expected time of arrival, at the time of or before arrival at the delivery address,
wait for the check for the ordered item by the user and delivery, and
autonomously travel to a position of any vehicle waiting area or the next delivery address instructed by the management center after the check for the ordered item by the user and delivery are completed.

* * * * *